(12) United States Patent
Hirayama

(10) Patent No.: US 7,673,339 B2
(45) Date of Patent: *Mar. 2, 2010

(54) INFORMATION PROCESSING APPARATUS, INFORMATION PROCESSING METHOD, INFORMATION PROCESSING SYSTEM AND RECORDING MEDIUM

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 1098 days.

This patent is subject to a terminal disclaimer.

(21) Appl. No.: 11/320,685

(22) Filed: Dec. 30, 2005

(65) Prior Publication Data

US 2006/0107332 A1    May 18, 2006

Related U.S. Application Data

(63) Continuation of application No. 09/811,516, filed on Mar. 20, 2001, now Pat. No. 7,260,842.

(30) Foreign Application Priority Data

Mar. 21, 2000    (JP) .............................. 2000-077628

(51) Int. Cl.
G06F 7/04    (2006.01)
(52) U.S. Cl. ....................................................... 726/21
(58) Field of Classification Search .................... 726/21
See application file for complete search history.

(56) References Cited

U.S. PATENT DOCUMENTS 3,852,571 A    12/1974    Hall et al.

6,331,865 B1    12/2001    Sachs et al.
2005/0236470 A1    10/2005    Hirayma

OTHER PUBLICATIONS

Penelope Stetz, The Cell Phone Handbook, May 10, 1999, Aegis Publishing Group Ltd., pp. 27-50.

*Primary Examiner*—Jacob Lipman
(74) *Attorney, Agent, or Firm*—Oblon, Spivak, McClelland, Maier & Neustadt, L.L.P.

(57) ABSTRACT

A member-store functional unit transfers the name of a member store and the title of a campaign to an ID-assigning functional unit which assigns IDs to the title of the campaign and the name of the member store. The ID-assigning functional unit then transmits the IDs to an encoding functional unit. A broadcasting functional unit broadcasts the IDs, encoded by the encoding functional unit, by multiplexing the IDs in an audio signal. A reception functional unit receives the IDs whereas a decoding functional unit extracts and decodes the IDs. The decoding functional unit then outputs the IDs to a customer-number-assigning functional unit with a receiver ID. The customer-number-assigning functional unit forms a judgment on validity of the member-store ID, the campaign ID and the receiver ID, and assigns a customer number to the receiver ID if the member-store ID, the campaign ID and the receiver ID are found valid. An anonymous-customer management functional unit sends the customer number to a member-store functional unit so as to make a request for a transmission of a service identified by the campaign ID to the reception functional unit by way of an anonymous-service management functional unit.

3 Claims, 28 Drawing Sheets

FIG. 12

DATABASE 43

| No | CAMPAIGN ID | VALIDITY CONDITION | MEMBER-STORE ID | MEMBER-STORE NETWORK ADDRESS | REMARK (CAMPAIGN TITLE) |
|---|---|---|---|---|---|
| 1 | 0001 | TABLE 0001 | Re0003 | www.cdshop.com | Best Soundtrack |
| 1 | 0002 | TABLE 0002 | Re0003 | www.cdshop.com | Symphony No.5 |
| 1 | 0003 | TABLE 0003 | Re0004 | www.books.com | Edison' Biography |

| BROADCASTING REFERENCE ID | MEDIUM | CHANNEL | OUTPUT TIME |
|---|---|---|---|
| BC0011 | SATELLITE RADIO | 112 | 2:30 FOR 45 TO 55 |
| BC0012 | SATELLITE RADIO | 134 | 3:35 FOR 15 TO 25 |
| BC0023 | SATELLITE RADIO | 112 | 4:10 FOR 00 TO 30 |

FIG. 13

TABLE OF VALIDITY CONDITIONS

| VALIDITY CONDITION | RESPONSE CONDITION OF RESPONSE DEADLINE | AGE RESTRICTION IN PROFILE INFORMATION | SUBSTANCE RESTRICTION IN PROFILE INFORMATION | RESPONSE CONDITION OF INDIVIDUAL AUTHENTICATION FUNCTION | RESPONSE CONDITION OF OTHER AERIAL RESTRICTIONS IN THE NAVIGATION FUNCTION | PAYMENT METHOD IN PROFILE INFORMATION | ADDITIONAL-INFORMATION-INPUTTING PROMPT | INPUT 1 IN ADDITIONAL INFORMATION | INPUT 2 IN ADDITIONAL INFORMATION | RESPONSE CONDITION OF RESTRICTIONS ON ACCOUNT BALANCE |
|---|---|---|---|---|---|---|---|---|---|---|
| 0001 | 23:59 ON 10/05/2001 | N/A | N/A | N/A | N/A | N/A | CHARACTER STRING X2 | ABC COLA | ABC MAN | N/A |
| 0002 | 12:00 ON 11/30/2001 | AT LEAST 18 YEARS OLD | ADULT | ONLY REGISTERED PERSONS | ALL US TERRITORIES EXCEPT ALASKA | JCB, VISA, AMEX | N/A | N/A | N/A | N/A |
| 0003 | 23:59 ON 12/02/2001 | NONE | FOR CHILDREN | N/A | ONLY CALIFORNIA | CHECKS ONLY | NUMBERS 1 TO 3 | 1 | N/A | AT LEAST 300 $ |

FIG. 17

PROFILE INFORMATION (EMBEDDED IN THE RECEIVER)

| ITEM NAMES IN PROFILE INFORMATION | CUSTOMER NUMBER | NAME | GENDER | CATALOGED ADDRESS | OCCUPATION |
|---|---|---|---|---|---|
| VALUES OF ITEM NAMES IN PROFILE INFORMATION | 046131 | JIRO YAMADA | MALE | 2-16-16 NISHI OHI SHINAGAWAKU | COMPANY EMPLOYEE |

| CATALOGED AREA | PAYMENT METHOD | AGE | CONTENTS |
|---|---|---|---|
| 6 PREFECTURES IN KANTO DISTRICT | VISA | 43 | EXCLUDING ADULTS |

FIG. 18

PROFILE INFORMATION IN THE DATABASE 47

| RECEIVER ID | CATALOGING DATE | NAME | GENDER | MODEL | CATALOGED ADDRESS | OCCUPA-TION |
|---|---|---|---|---|---|---|
| Ssny1003 | 06/06/2000 | JIRO YAMADA | MALE | TR-S55 | 2-16-16 NISHI OHI SHINAGAWA | COMPANY EMPLOYEE |

| CATALOGED AREA | PAYMENT METHOD | AGE | CONTENTS |
|---|---|---|---|
| 6 PREFECTURES IN KANTO DISTRICT | VISA | 43 | EXCLUDING ADULTS |

F I G. 19

TYPICAL CONTENTS OF THE RESPONSE CONDITION

| ITEM NAMES OF THE RESPONSE CONDITION | RESPONSE TIME AND DATE OF THE RESPONSE CONDITION | AUTHENTICATED PERSON OF THE RESPONSE CONDITION | DETECTED AREA BY NAVIGATION FUNCTION OF THE RESPONSE CONDITION | CURRENT ACCOUNT BALANCE OF THE RESPONSE CONDITION |
|---|---|---|---|---|
| ITEM VALUES OF THE RESPONSE CONDITION | 10:13 ON 10/03/2001 | CATALOGED PERSON | THE STATE OF CALIFORNIA | $342 |

FIG.20

DATABASE 47

| RECEIVER ID | CATALOGING DATE | USER NAME | MODEL |
|---|---|---|---|
| Ssny1001 | 2000/06/05 | TARO TANAKA | TR-S55 |
| Ssny1003 | 2000/06/06 | JIRO YAMADA | TR-S55 |
| Ssny1004 | 2000/06/06 | HANAKO SAITO | TR-S55 |

F I G. 22

| NAME | POSTAL ADDRESS | NETWORK ADDRESS | ACCOUNT-SETTLEMENT METHOD | CUSTOMER NUMBER |
|---|---|---|---|---|
| TOM HIRAYAMA | 1 Ssny Drive, Park Ridge, NJ | Hirayama@net.com | VISA 1234 5678 XXXX | C686853 |

GENDER AND OCCUPATION IN PROFILE INFORMATION

F I G. 27
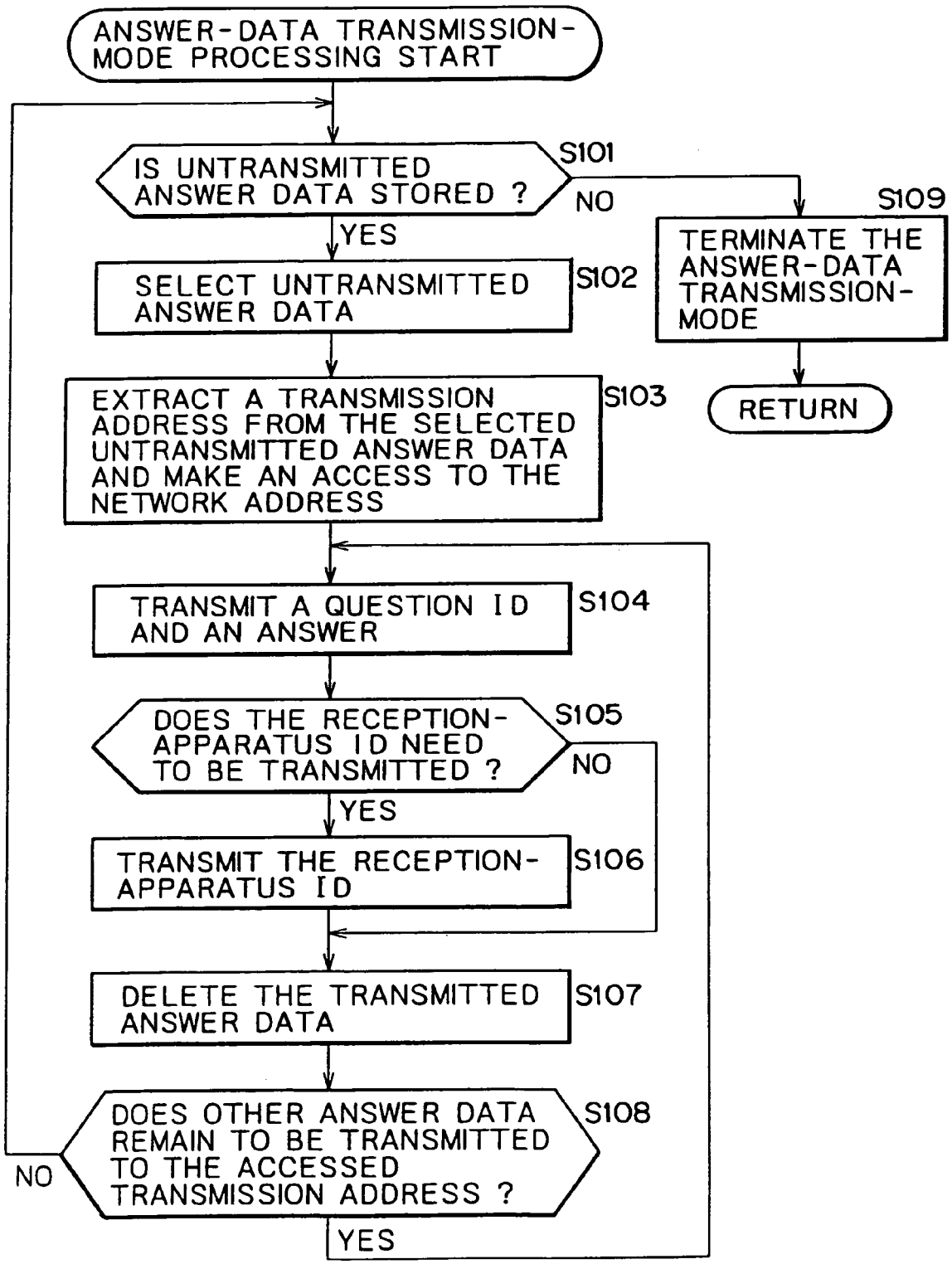

INFORMATION PROCESSING APPARATUS, INFORMATION PROCESSING METHOD, INFORMATION PROCESSING SYSTEM AND RECORDING MEDIUM

BACKGROUND OF THE INVENTION

The present invention relates to an information processing apparatus, an information processing method, an information processing system and a recording medium. More particularly, the present invention relates to an information processing apparatus, an information processing method, an information processing system and a recording medium that allow customers to be managed with ease at a low cost.

In recent years, the number of department stores and relatively large stores issuing the store's own card called a house card to each member customer has been increasing. By using a house card in a store issuing the card, a customer gets a discount to a certain degree and can make a payment through a money withdrawal from a bank account of the customer for a purchased commodity or service even if the customer does not bring cash.

By the way, when a department store or a retailer issues a house card to a customer, the store or the retailer obtains information on the customer such as the customers' address and name, which are filled in on an application form. Thus, in a sales campaign or the like, the department store or the retailer can notify the customer of the season, prompting the customer to purchase new commodities and services.

In such a conventional system, however, the store must prepare application forms each having a serial number, raising a problem of a higher cost.

In addition, a customer must fill in personal information such as the customer's address and name on an application form in order to obtain a house card. There is thus raised a problem of cumbersome work to fill in such personal information repeatedly to obtain several house cards from stores.

SUMMARY OF THE INVENTION

It is therefore an object of the present invention addressing the problems described above to make customer management on the store side less costly and simple as well as eliminate the work carried out by the customer to fill in the same personal information repeatedly on application forms.

An information processing apparatus provided by the present invention is characterized in that the information processing apparatus comprises a first information acquisition means for acquiring, from the second information processing apparatus, content identification information identifying a content presented by a first information processing apparatus, first information processing apparatus identification information identifying the first information processing apparatus and second information processing apparatus identification information identifying a second information processing apparatus, respectively, a validity judgment means for forming a judgment on validity of the content identification information, the first information processing apparatus identification information and the second information processing apparatus identification information, which are acquired by the first information acquisition means, an information assignment means for assigning customer identification information identifying a customer to the second information processing apparatus identification information and an information outputting means for outputting the customer identification information assigned by the information assignment means as information for receiving a presented content identified by the content identification information.

It is possible to implement a configuration of the information processing apparatus, wherein, if the first information processing apparatus identification information and the content identification information are transmitted, the first information acquisition means further acquires transmission identification information assigned to the transmission and the validity judgment means further forms a judgment on validity of the transmission identification information in addition to validity of the content identification information, the first information processing apparatus identification information and the second information processing apparatus identification information.

It is possible to implement a configuration of the information processing apparatus wherein the first information acquisition means further acquires additional information and the validity judgment means further forms a judgment on validity of the additional information.

It is possible to implement of the configuration wherein the information processing apparatus further includes a content requesting means for requesting the first information processing apparatus to provide a content identified by the content identification information on behalf of the second information processing apparatus.

It is possible to implement a configuration of the information processing apparatus wherein the first information acquisition means further acquires user information, which is information on a user of the second information processing apparatus.

An information processing method provided by the present invention is characterized in that the information processing method comprises a first information acquisition step of acquiring content identification information identifying a content presented by a first information processing apparatus, first information processing apparatus identification information identifying the first information processing apparatus and second information processing apparatus identification information identifying a second information processing apparatus from the second information processing apparatus, a validity judgment step of forming a judgment on validity of the content identification information, the first information processing apparatus identification information and the second information processing apparatus identification information, which are acquired at the first information acquisition step, an information assignment step of assigning customer identification information identifying a customer to the second information processing apparatus identification information on the basis of the judgment formed by the processing at the validity judgment step and an information outputting step of outputting the customer identification information assigned at the information assignment step as information for receiving a presented content identified by the content identification information.

A recording medium according to the present invention, for recording a program executable by a computer is characterized in that the program comprises a first information acquisition step of acquiring content identification information identifying a content presented by a first processing information, first information processing apparatus identification information identifying the first information processing apparatus and second information processing apparatus identification information identifying a second information processing apparatus from the second information processing apparatus, a validity judgment step of forming a judgment on validity of the content identification information, the first information processing apparatus identification information and the second information processing apparatus identification information, which are acquired at the first information acquisition step, an information assignment step of assigning customer identification information identifying a customer to the second information processing apparatus identification information on the basis of the judgment formed by the processing at the validity judgment step and an information outputting step of outputting the customer identification information assigned at the information assignment step as information for receiving a presented content identified by the content identification information.

An information processing system according to the present invention comprising a first information processing apparatus for presenting a content, a second information processing apparatus connected to the first information processing apparatus by a network, a third information processing apparatus for receiving information prescribed by the second information processing apparatus and a fourth information processing apparatus for carrying out processing corresponding to a request made by the third information processing apparatus is characterized in that the second information processing apparatus comprises a first information acquisition means for acquiring information on a content presented by the first information processing apparatus and information on the first information processing apparatus from the first information processing apparatus, an information generation means for generating content identification information identifying a content presented by the first information processing apparatus and first information processing apparatus identification information identifying the first information processing apparatus on the basis of the information on a content and the information on the first information processing apparatus, which are acquired from the first information acquisition means, a first information storage means for storing the content identification information and the first information processing apparatus identification information, which are generated by the information generation means, as associated information, a first information outputting means for directly or indirectly outputting the content identification information and the first information processing apparatus identification information, which are stored in the first information storage means, to the third information processing apparatus and an information transmission means for transmitting the associated information stored in the first information storage means to the fourth information processing apparatus in response to a request made by the fourth information processing apparatus through the network, the third information processing apparatus comprises information extraction means for extracting the content identification information and the first information processing apparatus information from a received signal, a second information storage means for storing second information processing apparatus identification information identifying the third information processing apparatus itself and a content requesting means for transmitting the content identification information and the first information processing apparatus identification information which are extracted by the information extraction means, along with the second information processing apparatus identification information which is stored in the second information storage means, to the fourth information processing apparatus in order to request the first information processing apparatus that the content identified by the content identification information be presented and the fourth information processing apparatus comprising a second information acquisition means for acquiring the content identification information, the first information processing apparatus identification information and the second information processing apparatus identification information from the third information processing apparatus, a validity judgment means for forming a judgment on validity of the content identification information, the first information processing apparatus identification information and the second information processing apparatus identification information, which are acquired by the second information acquisition means, an information assignment means for assigning customer identification information identifying a customer to the second information processing apparatus identification information on the basis of the judgment formed by the validity judgment means and a second information outputting means for outputting the customer identification information assigned by the information assignment means as information for receiving a presented content identified by the content identification information.

An information processing method adopted by an information processing system according to the present invention comprising a first information processing apparatus for presenting a content, a second information processing apparatus connected to the first information processing apparatus by a network, a third information processing apparatus for receiving information prescribed by the second information processing apparatus and a fourth information processing apparatus for carrying out processing corresponding to a request made by the third information processing apparatus is characterized in that the information processing method adopted by the second information processing apparatus comprises a first information acquisition controlling step of controlling acquisition of information on a content presented by the first information processing apparatus and information on the first information processing apparatus from the first information processing apparatus, an information generation step of generating content identification information identifying a content presented by the first information processing apparatus and first information processing apparatus identification information identifying the first information processing apparatus on the basis of the information on a content and the information on the first information processing apparatus, whose acquisition is controlled at the first information acquisition controlling step, a first information storage controlling step of controlling storage of the content identification information and the first information processing apparatus identification information, which are generated at the information generation step, as associated information, a first information outputting controlling step of directly or indirectly controlling outputting of the content identification information and the first information processing apparatus identification information, whose storage is controlled at the first information storage controlling step, to the third information processing apparatus and an information transmission controlling step of controlling transmission of the associated information, whose storage is controlled at the first information storage controlling step to the fourth information processing apparatus in response to a request made by the fourth information processing apparatus through the network, the information processing method adopted by the third information processing apparatus comprises information extraction controlling step of controlling extraction of the content identification information and the first information processing apparatus information from a received signal, a second information storage controlling step of controlling storage of second information processing apparatus identification information identifying the third information processing apparatus and a content requesting step of transmitting the content identification information and the first information processing apparatus identification information, whose extraction is controlled at the information extraction controlling step, along with the second information processing apparatus identification information whose storage is controlled at the second information storage controlling step, to the fourth information processing apparatus in order to request the first information processing apparatus that the content identified by the content identification information be presented and the information processing method adopted by the fourth information processing apparatus comprises a second information acquisition controlling step of controlling acquisition of the content identification information, the first information processing apparatus identification information and the second information processing apparatus identification information from the third information processing apparatus, a validity judgment step of forming a judgment on validity of the content identification information, the first information processing apparatus identification information and the second information processing apparatus identification information, whose acquisition is controlled at the second information acquisition controlling step, an information assignment step of assigning customer identification information identifying a customer to the second information processing apparatus identification information on the basis of the judgment formed by the processing at the validity judgment step and a information outputting controlling step of controlling outputting of the customer identification information assigned at the information assignment step as information for receiving a presented content identified by the content identification information.

A recording medium for recording an information processing program executable by a computer in an information processing system according to the present invention comprising a first information processing apparatus for presenting a content, a second information processing apparatus connected to the first information processing apparatus by a network, a third information processing apparatus for receiving information prescribed by the second information processing apparatus and a fourth information processing apparatus for carrying out processing corresponding to a request made by the third information processing apparatus is characterized in that the information processing program in the second information processing apparatus comprises a first information acquisition controlling step of controlling acquisition of information on a content presented by the first information processing apparatus and information on the first information processing apparatus from the first information processing apparatus, an information generation step of generating content identification information identifying a content presented by the first information processing apparatus and first information processing apparatus identification information identifying the first information processing apparatus on the basis of the information on a content and the information on the first information processing apparatus, whose acquisition is controlled at the first information acquisition controlling step, a first information storage controlling step of controlling storage of the content identification information and the first information processing apparatus identification information, which are generated at the information generation step, as associated information, a first information outputting controlling step of directly or indirectly controlling outputting of the content identification information and the first information processing apparatus identification information, whose storage is controlled at the first information storage controlling step, to the third information processing apparatus and an information transmission controlling step of controlling transmission of the associated information, whose storage is controlled at the first information storage controlling step to the fourth information processing apparatus in response to a request made by the fourth information processing apparatus through the network, the information processing program in the third information processing apparatus comprises information extraction controlling step of controlling extraction of the content identification information and the first information processing apparatus information from a received signal, a second information storage controlling step of controlling storage of second information processing apparatus identification information identifying the third information processing apparatus and a content requesting step of transmitting the content identification information and the first information processing apparatus identification information, whose extraction is controlled at the information extraction controlling step, along with the second information processing apparatus identification information whose storage is controlled at the second information storage controlling step, to the fourth information processing apparatus in order to request the first information processing apparatus that the content identified by the content identification information be presented and the information processing program in the fourth information processing apparatus comprises a second information acquisition controlling step of controlling acquisition of the content identification information, the first information processing apparatus identification information and the second information processing apparatus identification information from the third information processing apparatus, a validity judgment step of forming a judgment on validity of the content identification information, the first information processing apparatus identification information and the second information processing apparatus identification information, whose acquisition is controlled at the second information acquisition controlling step, an information assignment step of assigning customer identification information identifying a customer to the second information processing apparatus identification information on the basis of the judgment formed by the processing at the validity judgment step and a information outputting controlling step of controlling outputting of the customer identification information assigned at the information assignment step as information for receiving a presented content identified by the content identification information.

In accordance with an information processing apparatus as well as an information processing method, which are provided by the present invention, and a program recorded on a recording medium also provided by the present invention, content identification information, first information processing apparatus identification information and second information processing apparatus identification information are subjected to judgment on validity thereof, and customer identification information identifying a customer is assigned to the second information processing identification information on the basis of a result of the judgment. Then, the customer identification information is output as information for receiving a presented content identified by the content identification information.

In an information processing system and information processing method as well as the program stored in the recording medium provided by the present invention, the second information processing apparatus generates content identification information for information on a content acquired from the first information processing apparatus, the third information processing apparatus extracts the content identification information from a received signal and transmits the extracted content identification information and second information processing apparatus identification information identifying the third information processing apparatus itself to the fourth information processing apparatus to make a request for presentation of a content identified by the content identification information and the fourth information processing apparatus forms a judgment on validity of the content identification information, the first information processing apparatus identification information and the second information processing apparatus identification information, which are received from the third information processing apparatus, and assigns customer identification information identifying the customer on the basis of a result of the judgment.

In accordance with an information processing apparatus as well as an information processing method, which are provided by the present invention, and a program recorded on a recording medium also provided by the present invention, content identification information, first information processing apparatus identification information and second information processing apparatus identification information are acquired and subjected to judgment on validity thereof, and customer identification information identifying a customer is then assigned on the basis of a result of the judgment. Subsequently, the customer identification information is output as information for receiving a presented content. As a result, the administrator of a first information processing apparatus is capable of managing customers with ease and with a high degree of reliability. In addition, in order to receive a presented content, it is not necessary for a customer to supply personal information. Thus, a customer is capable of receiving a content with ease and with a high degree of reliability.

In accordance with another information processing apparatus as well as another information processing method, which are provided by the present invention, and a program recorded on another recording medium also provided by the present invention, the second information processing apparatus generates content identification information for information on a content acquired from the first information processing apparatus, the third information processing apparatus extracts the content identification information from a received signal and transmits the extracted content identification information, first information processing apparatus identification information and second information processing apparatus identification information identifying the third information processing apparatus itself to the fourth information processing apparatus and the fourth information processing apparatus forms a judgment on validity of the content identification information, the first information processing apparatus identification information and the second information processing apparatus identification information, which are received from the third information processing apparatus, and assigns customer identification information to the second information processing apparatus identification information on the basis of a result of the judgment, and outputs the customer identification information as information for receiving a presented content. As a result, it is possible to implement a system wherein the content providing side is capable of managing customers with ease and with a high degree of reliability. In addition, in order to receive a presented content, it is not necessary for a customer to supply personal information many times so that a customer is capable of receiving a content with ease and with a high degree of reliability.

BRIEF DESCRIPTION OF THE DRAWINGS

FIG. 12 is a diagram showing a typical validity-condition.

FIG. 13 is an explanatory diagram showing information stored in a database employed in an ID-assigning functional unit employed in the information processing system shown in FIG. 2.

FIG. 17 is an explanatory diagram showing profile-information stored in a reception functional unit employed in the information processing system shown in FIG. 2.

FIG. 18 is an explanatory diagram showing typical information stored in a database of a receiver-management functional unit employed in the information processing system shown in FIG. 2.

FIG. 19 is an explanatory diagram showing a response condition.

FIG. 20 is an explanatory diagram showing other information stored in the database of the receiver-management functional unit employed in the information processing system shown in FIG. 2.

FIG. 22 is an explanatory diagram showing information stored in a database of the privacy-guarding functional unit employed in the information processing system shown in FIG. 2.

FIG. 27 is a flowchart used for explaining details of processing carried out in answer-data transmission-mode at a step S90 of the flowchart shown in FIG. 26.

DETAILED DESCRIPTION OF THE PREFERRED EMBODIMENT

Figure 1:
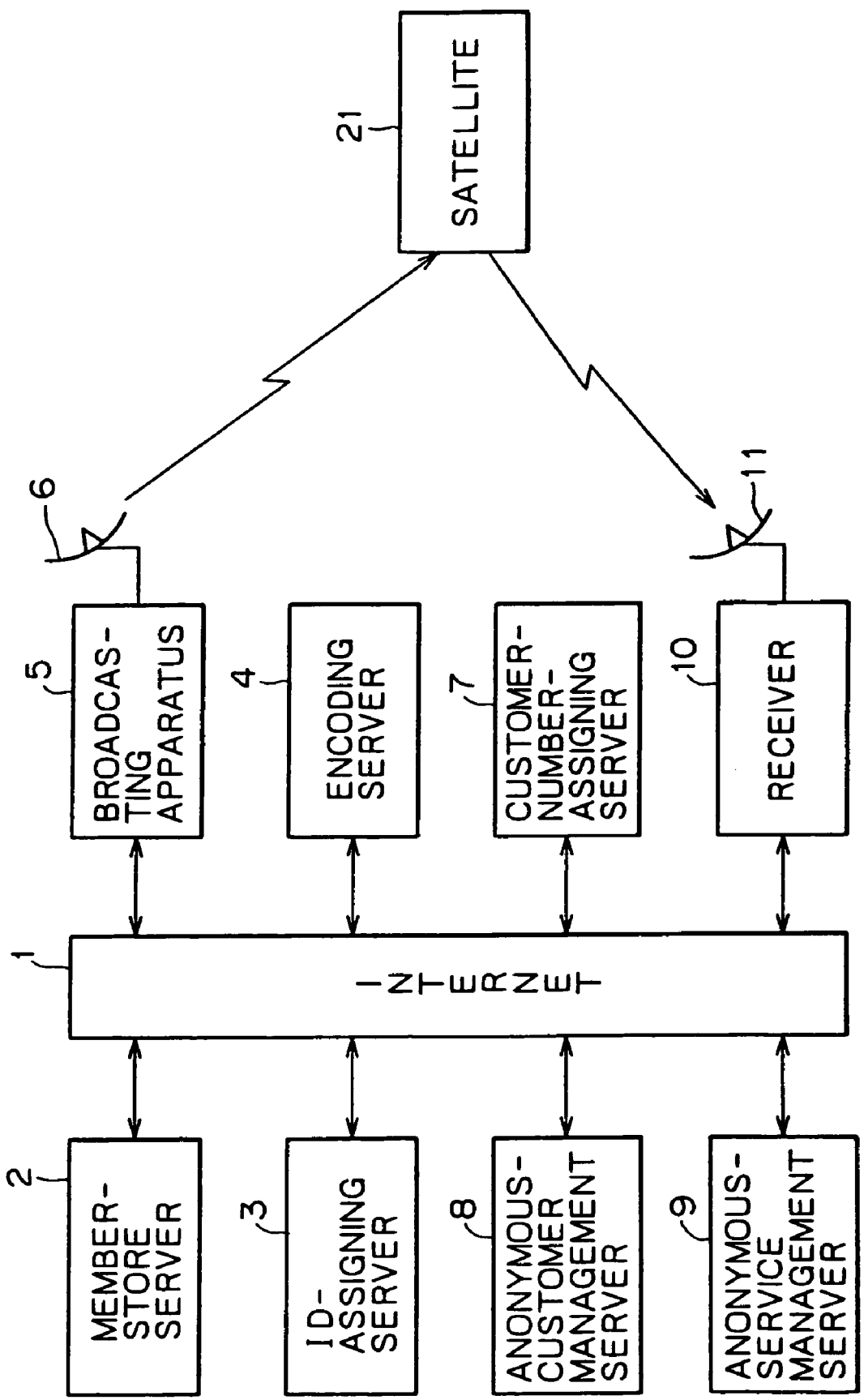
FIG. 1 is a block diagram showing a typical configuration of an information processing system provided by the present invention.

FIG. 1 is a diagram showing a typical configuration of an information processing system provided by the present invention. In this typical configuration, a member-store server 2, an ID-assigning server 3, a encoding server 4, a broadcasting apparatus 5, a customer-number-assigning server 7, a anonymous-customer management server 8, a anonymous-service management server 9 and a receiver 10 are connected to the Internet 1. It should be noted, however, that if the receiver 10 is not a receiver used at home, that is, if the receiver 10 is a portable receiver or a receiver mounted on a vehicle, the receiver 10 can be connected to the customer-number-assigning server 7 by a radio network. The broadcasting apparatus 5 transmits a broadcast electric wave from an antenna 6 to a satellite 21. On the other hand, the receiver 10 receives an electric wave from the satellite 21 by using an antenna 11.

A member store providing contents, the administrators of the ID-assigning server 3, the encoding server 4, the broadcasting apparatus 5, the customer-number-assigning server 7, the anonymous-customer management server 8 and the anonymous-service management server 9 make contracts with each other, each pay a predetermined amount of security money and each request that predetermined pieces of processing be carried out. Unless otherwise specified, a content used in the following description may mean a service or a commodity.

It should be noted that the network can of course be other than the Internet 1.

In addition, it is needless to say that transmission from the broadcasting apparatus 5 to the receiver 10 can be implemented by using communication media other than the satellite 21. Examples of the other communication media are ground-wave broadcasting, broadcasting through a cable, the Internet, a pager system and broadcasting by adoption of a multi-casting means using hand-phone lines.

Figure 2:
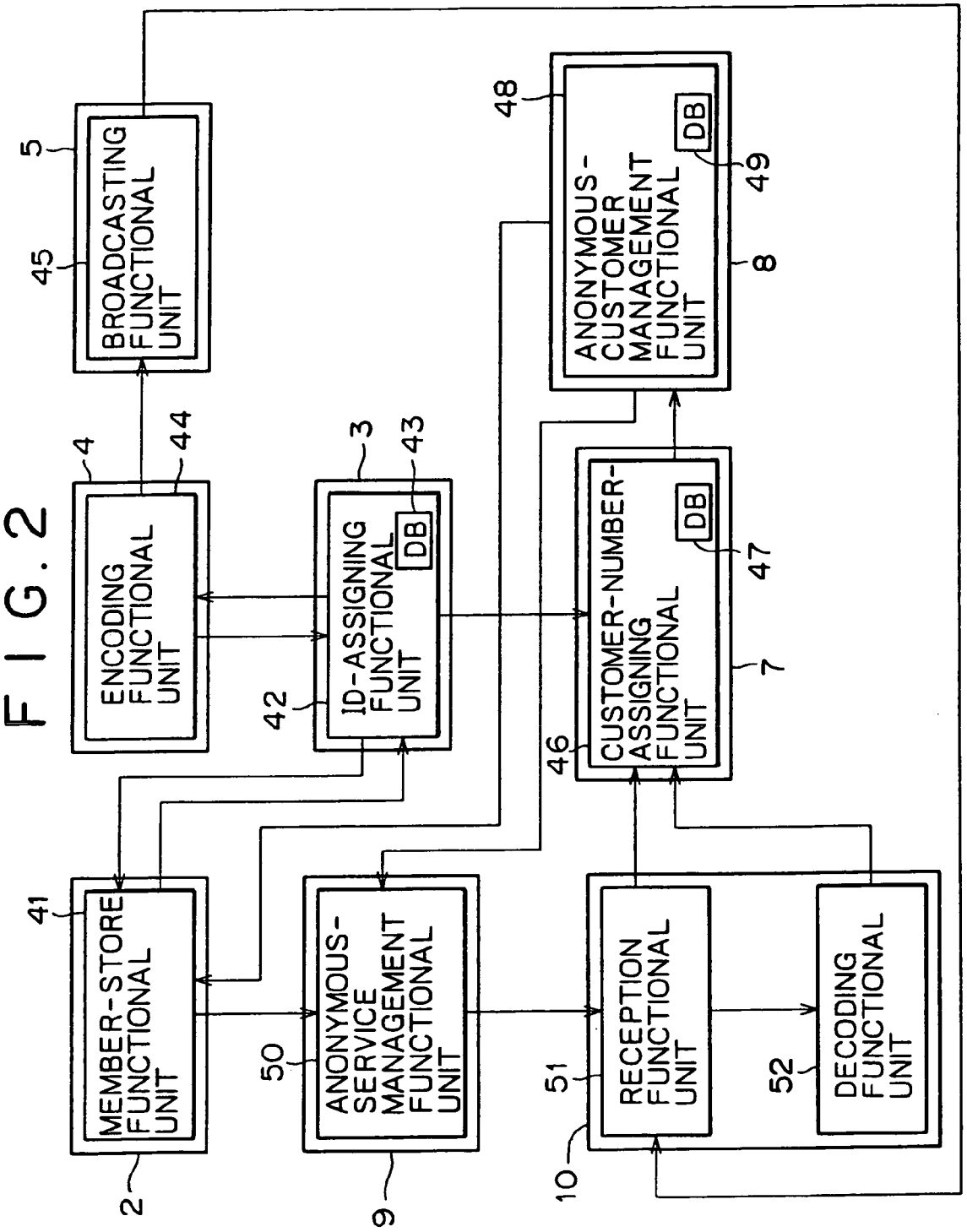
FIG. 2 is a block diagram showing the configuration of functional elements employed in the information processing system of FIG. 1.

FIG. 2 is a functional block diagram showing the elements employed in the information processing system of FIG. 1, from the member-store server 2 to the receiver 10. As shown in FIG. 2, the member-store server 2 owned by a member store providing contents has a member-store functional unit 41. The member-store functional unit 41 has information used for introducing contents provided by the member store to typically the listener listening to a radio broadcast. The information includes a member-store name, that is, the name of the member store, a member-store address, that is, the network address of the member store and a campaign title, that is, the title of a presented content. The network address of the member store is used by the listener to make an access to the member store through the Internet 1.

The member-store functional unit 41 also holds a validity-condition, which is a condition for presenting a content provided by the member store. The validity-condition includes an additional-information-inputting prompt for prescribing additional information to be entered by the listener. The additional information is information such as a string of characters or a number specified individually by the user. The additional information can be a response to a quiz, a response to a questionnaire, a number of a lottery, a password or the name of a commodity which is mentioned by the listener listening to a radio program. The member-store functional unit 41 carries out processing to provide a content at a request made by a content recipient.

The ID-assigning server 3 has an ID-assigning functional unit 42. When receiving the name of a member store, the network address of the member store, the title of a campaign and a validity-condition including the additional-information-inputting prompt from the member-store functional unit 41, the ID-assigning functional unit 42 assigns a member-store ID for identifying the member store to the member store and assigns a campaign ID for identifying the campaign to the title of the campaign. The ID-assigning functional unit 42 stores the name of the member store, the network address of the member store, the title of the campaign, the member-store ID, the campaign ID and the validity-condition in a database 43 by associating one with another.

The encoding server 4 has a encoding functional unit 44. When receiving a member-store ID, a campaign ID and the additional-information-inputting prompt included in a validity-condition from the ID-assigning functional unit 42, the encoding functional unit 44 adds a broadcasting reference ID to the member-store ID, the campaign ID and the additional-information-inputting prompt. The broadcasting reference ID shows information related to broadcasting of the member-store ID, the campaign ID and the additional-information-inputting prompt. The information includes an order, media, a date and time and a channel of the broadcasting. The encoding functional unit 44 supplies this broadcasting reference ID to the ID-assigning functional unit 42 and stores the member-store ID and the campaign ID in the database 43. The encoding functional unit 44 further encodes the member-store ID, the campaign ID, the additional-information-inputting prompt and the broadcasting reference ID into encoded data having a format suitable for broadcasting from the broadcasting apparatus 5 by way of the satellite 21. The encoding functional unit 44 supplies the encoded data to the broadcasting apparatus 5 by way of the Internet 1.

The broadcasting apparatus 5 has a broadcasting functional unit 45 for broadcasting the encoded data received from the encoding functional unit 44 employed in the encoding server 4 to the receiver 10 by way of the antenna 6 and the satellite 21.

The encoded data may be broadcasted by transmission other than the digital radio broadcasting through the satellite 21. Examples of such transmission are digital television broadcasting through a satellite, ground-wave digital television broadcasting, ground-wave digital radio broadcasting, transmission through a digital CATV network, transmission through a pager data broadcasting network, Internet multi-casting transmission and hand-phone multi-casting transmission. In this case, the encoding functional unit 44 carries out processing to convert the format of the encoded data into a format of the transmission.

The receiver 10 comprises a reception functional unit 51 and a decoding functional unit 52. The reception functional unit 51 receives digital broadcast data broadcasted by the broadcasting functional unit 45, and extracts encoded data from the digital broadcast data. The reception functional unit 51 also forms a judgment as to whether the extracted encoded data is valid or invalid. If the extracted encoded data is determined to be valid, the reception functional unit 51 supplies the data to the decoding functional unit 52. If the extracted encoded data is determined to be invalid, on the other hand, the reception functional unit 51 informs the user of the invalidity.

In addition, the reception functional unit 51 stores a receiver-ID for identifying the receiver 10 and personal information (or profile-information) of a user (or a listener) such as the name of the user, the postal address of the user and the age of the user. If necessary, the reception functional unit 51 transmits the receiver-ID and the personal information to a customer-number-assigning functional unit 46 employed in the customer-number-assigning server 7 in advance to be stored in a database 49. That is to say, the user makes a contract with the administrators of the customer-number-assigning server 7 and has the information on the user itself stored in the database 49.

The decoding functional unit 52 decodes encoded data received from the reception functional unit 51, and extracts a member-store ID, a campaign ID, an additional-information-inputting prompt as well as a broadcasting reference ID. In addition, the decoding functional unit 52 stores additional information entered by the content recipient in response to typically an inquiry made by the member store. For the additional information entered by the content recipient, the decoding functional unit 52 also generates a dynamically varying condition (information) as a response condition to be transmitted to a customer-number-assigning functional unit 46 employed in the customer-number-assigning server 7. To put it concretely, the dynamically varying condition is information on the user such as a time the additional information is entered and the name of a person entering the additional information.

The customer-number-assigning server 7 has the customer-number-assigning functional unit 46. When receiving a member-store ID, a campaign ID and a broadcasting reference ID from the decoding functional unit 52, the customer-number-assigning functional unit 46 examines the database 43 of the ID-assigning functional unit 42 to determine whether or not associated data is stored therein. In addition, the customer-number-assigning functional unit 46 also determines whether a receiver-ID received from the reception functional unit 51 is valid or invalid. The customer-number-assigning functional unit 46 also determines whether or not a response condition received from the decoding functional unit 52 matches a validity-condition stored in the ID-assigning functional unit 42 in advance.

The customer-number-assigning functional unit 46 stores the receiver-ID of the receiver 10 and profile-information (personal information) of the user, which are received from the reception functional unit 51 in advance, in the database 49 for management purposes. In addition, a temporary customer number is assigned to the receiver ID.

The anonymous-customer management server 8 includes the anonymous-customer management functional unit 48 and the database 49. When privacy protection is selected in accordance with additional information entered by the content recipient to the decoding functional unit 52 and the privacy protection is approved in accordance with a validity-condition stored in the database 43 of the ID-assigning functional unit 42 by the member-store functional unit 41. In case there is a request for presentation of a campaign identified by a campaign ID from the customer-number-assigning functional unit 46. An approval of privacy protection indicates that the use of a privacy-guarding function is agreed on by both the member store providing a content and the content recipient receiving the content. Then, the anonymous-customer management functional unit 48 supplies profile-information in a range approved in accordance with a response condition on the user side and a validity-condition on the member store side to the member store functional unit 41 employed in the ID-assigning server 3 along with the member-store ID, the campaign ID and the customer number.

The anonymous-service management server 9 has the anonymous-service management functional unit 50. The anonymous-service management functional unit 50 supplies a campaign identified by a campaign ID specified by the reception functional unit 51 (or the user) at a request made by the member-store functional unit 41 or a request made by the anonymous-customer management functional unit 48.

Figure 3:
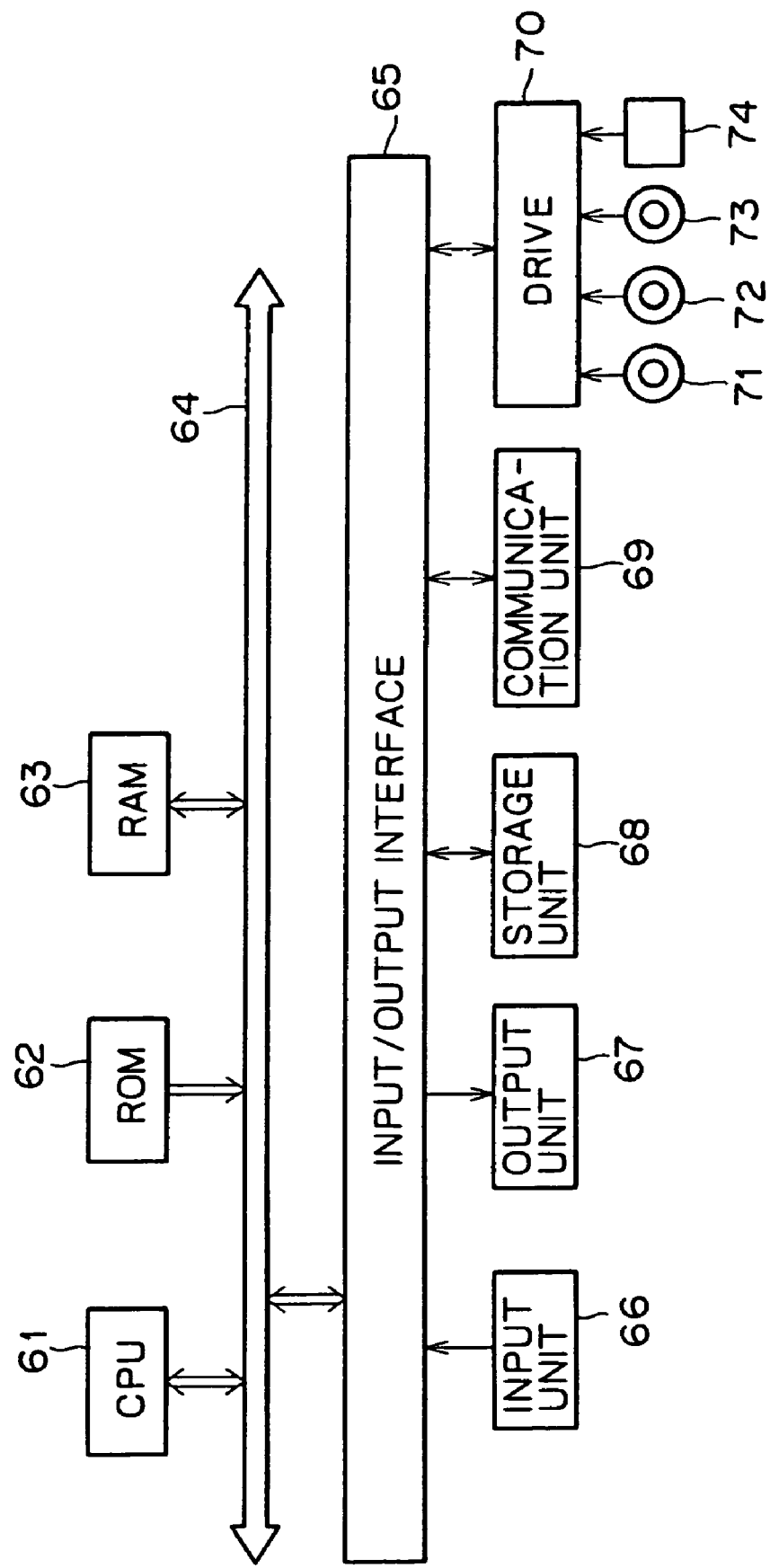
FIG. 3 is a block diagram showing a typical configuration of a ID-assigning server employed in the information processing system of FIG. 1.

FIG. 3 is a diagram showing a typical configuration of the ID-assigning server 3. A CPU (Central Processing Unit) 61 carries out various kinds of processing by execution of a program stored in a ROM (Read Only Memory) 62 in advance or a program loaded into a RAM (Random Access Memory) 63 from a storage unit 68. The RAM 63 is also used for storing data required during the execution of the various kinds of processing by the CPU 61.

As shown in the figure, the CPU 61, the ROM 62 and the RAM 63 are connected to each other by a bus 64. An input/output interface 65 is also connected to the bus 64.

The input/output interface 65 is connected to an input unit 66 including a keyboard and a mouse, an output unit 67 including a display unit such as a CRT or an LCD and a speaker, a storage unit 68 such as a hard disk and a communication unit 69 including a modem and a terminal adapter. The communication unit 69 carries out communications with other apparatuses through the Internet 1.

If necessary, the input/output interface 65 is also connected to a drive 70 for driving a memory device such as a magnetic disk 71, an optical disk 72, a magnetic optical disk 73 or a semiconductor memory 74. A program can be read out from such a memory device and installed into the storage unit 68 when needed.

It should be noted that the other servers each have basically the same configuration as the ID-assigning server 3 even though the configurations of the other servers are shown in none of the figures. The broadcasting apparatus 5 communicates with the communication unit 69 through the antenna 6 and the satellite 21. The configuration of the receiver 10 will be explained later by referring to FIG. 23.

Operations are described by referring to a flowchart shown in FIGS. 4 to 11 as follows.

Figure 4:
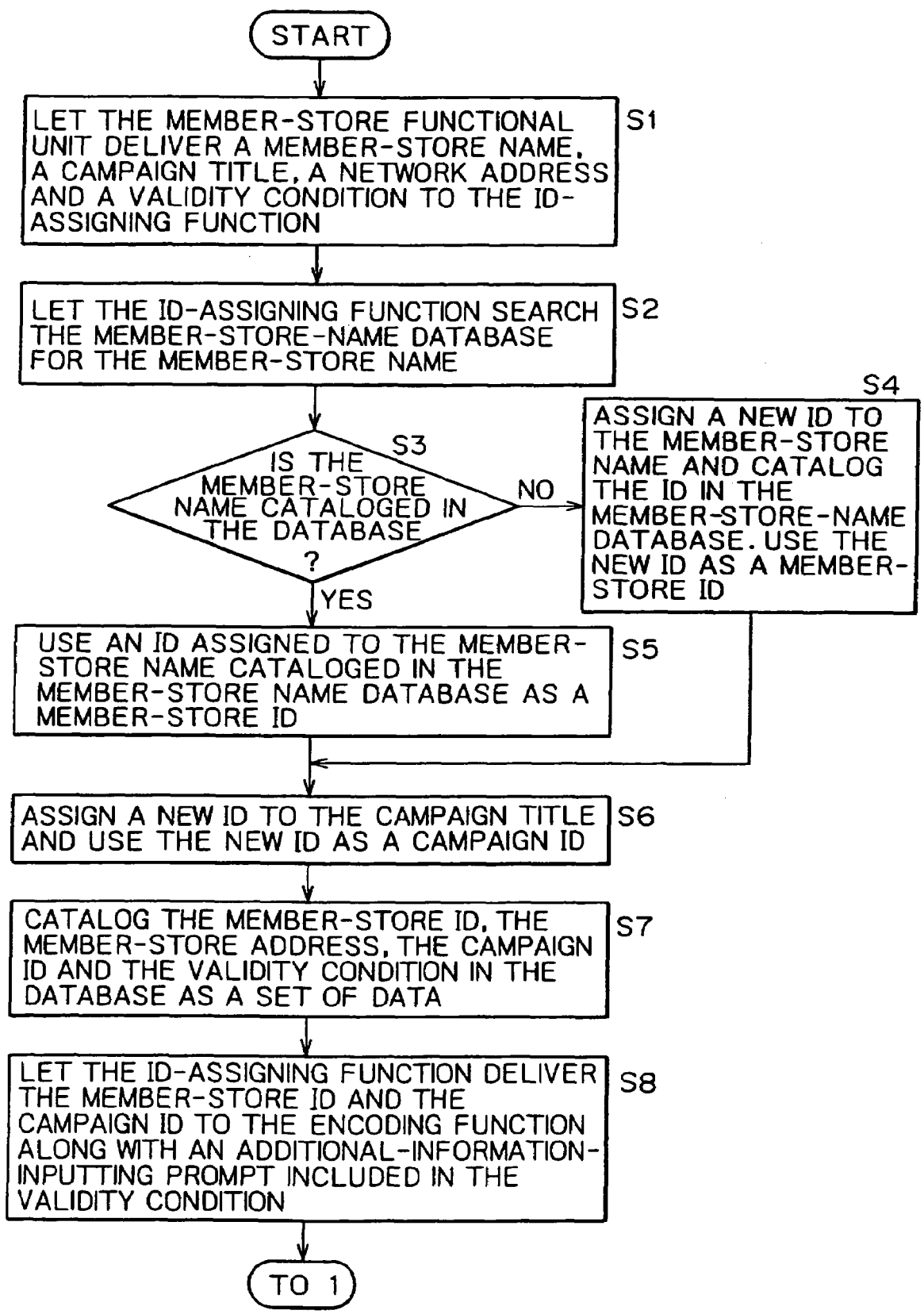
FIG. 4 is a flowchart used for explaining processing carried out by the information processing system shown in FIG. 1.

The flowchart begins with a step S1 shown in FIG. 4 at which the member store providing a content operates the member-store server 2 to transmit information from the member-store functional unit 41 to the ID-assigning functional unit 42 employed in the ID-assigning server 3 by way of the Internet 1. The information includes a campaign title, that is, the title of a campaign for a provided content, a name used as a member-store name, the member store's network address used for making an access to the member-store server 2 through the Internet 1 and a validity-condition including additional-information-inputting prompt, details of which will be described later by referring to FIG. 13. At the next step S2, the ID-assigning functional unit 42 searches the database 43 for a member store name matching the member store name received from the member-store functional unit 41.

At the next step S3, the ID-assigning functional unit 42 forms a judgment as to whether or not the member store's name received from the member-store functional unit 41 has already been cataloged in the database 43. If the member store's name received from the member-store functional unit 41 has not been cataloged in the database 43, the flow of the operations goes on to a step S4 at which a new member-store ID is assigned to the member store's name and the member store's name is cataloged in the database 43. The new ID is used as a member-store ID. If the outcome of the judgment formed at the step S3 indicates that the member store's name received from the member-store functional unit 41 has already been cataloged in the database 43, on the other hand, the flow of the operations goes on to a step S5 at which the ID-assigning functional unit 42 reads out an ID assigned to the name of the member store from the database 43 and used the ID as a member-store ID.

The flow of the operations then goes on from the step S4 or S5 to a step S6 at which the ID-assigning functional unit 42 assigns a new ID to a campaign title received from the member-store functional unit 41 and uses the assigned ID as a campaign ID. At the next step S7, the ID-assigning functional unit 42 catalogs the member-store ID, the campaign ID assigned at the step S6, the network address of the member store and the validity-condition received from the member-store functional unit 41 at the step S2 in the database 43 as a set of data. The cataloged member-store ID is the member-store ID assigned at the step S4 or S5 whereas the cataloged network address of the member store is the member store's network address newly cataloged at the step S4 or the member store's network address read out at the step S5 along with the member-store ID.

An example of the database 43 employed in the ID-assigning functional unit 42 is shown in FIG. 12. As shown in the figure, the database 43 includes campaign IDs such as 0001, 0002 and 0003, member-store IDs such as Re0003 and Re0004, member store network addresses such as www.cd-shop.com and www.books.com and campaign titles such as "Best Soundtrack", "Symphony No. 5" and "Edison's Biography". For example, the campaign ID 0001 is associated with the member-store ID Re0003, the member store network address www.cdshop.com and the campaign title Best Soundtrack.

Further, a medium ID, a channel ID and an output time are added as a broadcasting reference ID.

The database 43 also includes table entry numbers 0001 to 0003 each associated with a campaign ID. Each table entry number is a validity-condition shown in FIG. 13.

A validity-condition is a condition imposed by a member store on a content recipient or a content purchaser. As shown in FIG. 13, in a validity-condition indicated by the table entry number 0001, a deadline for accepting a response is set at 23:59 on Oct. 5, 2001. In a validity-condition indicated by the table entry number 0002, a deadline for accepting a response is set at 12:00 on Nov. 30, 2001. In a validity-condition indicated by the table entry number 0003, a deadline for accepting a response is set at 23:59 on Dec. 2, 2001. A deadline for accepting a response is a deadline by which a content recipient must give a response to an inquiry made by the member store. That is to say, a response received after the deadline is not accepted. To be more specific, a response received after the time and the date specified in the validity-condition is not accepted.

As shown in FIG. 13, in a validity-condition indicated by the table entry number 0002, an age restriction is set at 18 years old. That is to say, a content recipient responding to the validity-condition indicated by the table entry number 0002 must be at least 18 years old. This age restriction is not applicable (N/A) to a validity-condition indicated by the table entry number 0001 and there is no age restriction (None) for validity-condition indicated by the table entry number 0003.

In a validity-condition indicated by the table entry number 0002, the profile-information is classified to be an adult category. In a validity-condition indicated by the table entry number 0003, the profile-information is classified to be a child-oriented category. Thus, a content recipient responding to the validity-condition indicated by the table entry number 0002 must be an adult of at least a predetermined age and a content recipient responding to the validity-condition indicated by the table entry number 0003 must be a child under a predetermined age.

In a validity-condition indicated by the table entry number 0002, a personal-verification function is prescribed to be a registered person. Thus, a responding content recipient must be a registered user.

In a validity-condition indicated by the table entry number 0002, a payment means in the profile-information is prescribed to be use of a credit card such as JCB, VISA or AMEX, which are each a service mark. In a validity-condition indicated by the table entry number 0003, the payment means in the profile-information is prescribed to be use of a bank check. The content recipient is required to pay a content fee by using the prescribed method.

In a validity-condition indicated by the table entry number 0002, an area restriction of a navigation function is prescribed to be all the US territories except Alaska. In a validity-condition indicated by the table entry number 0003, the area restriction of the navigation function is prescribed to be California only. That is to say, a responder is required to be a resident or presently located in the prescribed territory.

In a validity-condition indicated by the table entry number 0001, an additional-information-inputting prompt is prescribed to require an input of a string of 2 characters. In a validity-condition indicated by the table entry number 0003, an additional-information-inputting prompt is prescribed to require an input of a string of up to 3 characters.

In a validity-condition indicated by the table entry number 0001, input 1 in the additional information, that is, a correct answer to a first question of a quiz, is prescribed to be 'ABC cola'. In a validity-condition indicated by the table entry number 0003, input 1 in the additional information prescribes the correct answer, which is a number 1.

In a validity-condition indicated by the table entry number 0001, input 2 in the additional information, that is, a correct answer to a second question of a quiz, is prescribed to be 'an ABC man'. The responder is required to enter these correct answers.

In a validity-condition indicated by the table entry number 0003, the lower limit of a balance of an account is prescribed to be 300 dollars. Thus, a content recipient is required to have a balance of an account of at least 300 dollars.

By prescribing a validity-condition in advance as described above, a member store providing a content is capable of limiting content requesters to those within a predetermined range.

At the next step S8 of the flowchart shown in FIG. 4, the ID-assigning functional unit 42 transmits the member-store ID, the campaign ID, and the additional-information-inputting prompt in the validity-condition to the encoding functional unit 44 through the Internet 1.

At the next step S9, the encoding functional unit 44 adds a broadcasting reference ID to the member-store ID, the campaign ID and the additional-information-inputting prompt. The broadcasting reference ID shows information related to broadcasting of the member-store ID, the campaign ID and the additional-information-inputting prompt. The information includes an order, a time, media and a channel type of the broadcasting. In this embodiment, the encoding functional unit 44 encodes the member-store ID, the campaign ID, the additional-information-inputting prompt and the broadcasting reference ID into encoded data having a format suitable for broadcasting from the broadcasting apparatus 5 to the receiver 10 by way of the satellite 21.

Figure 14:
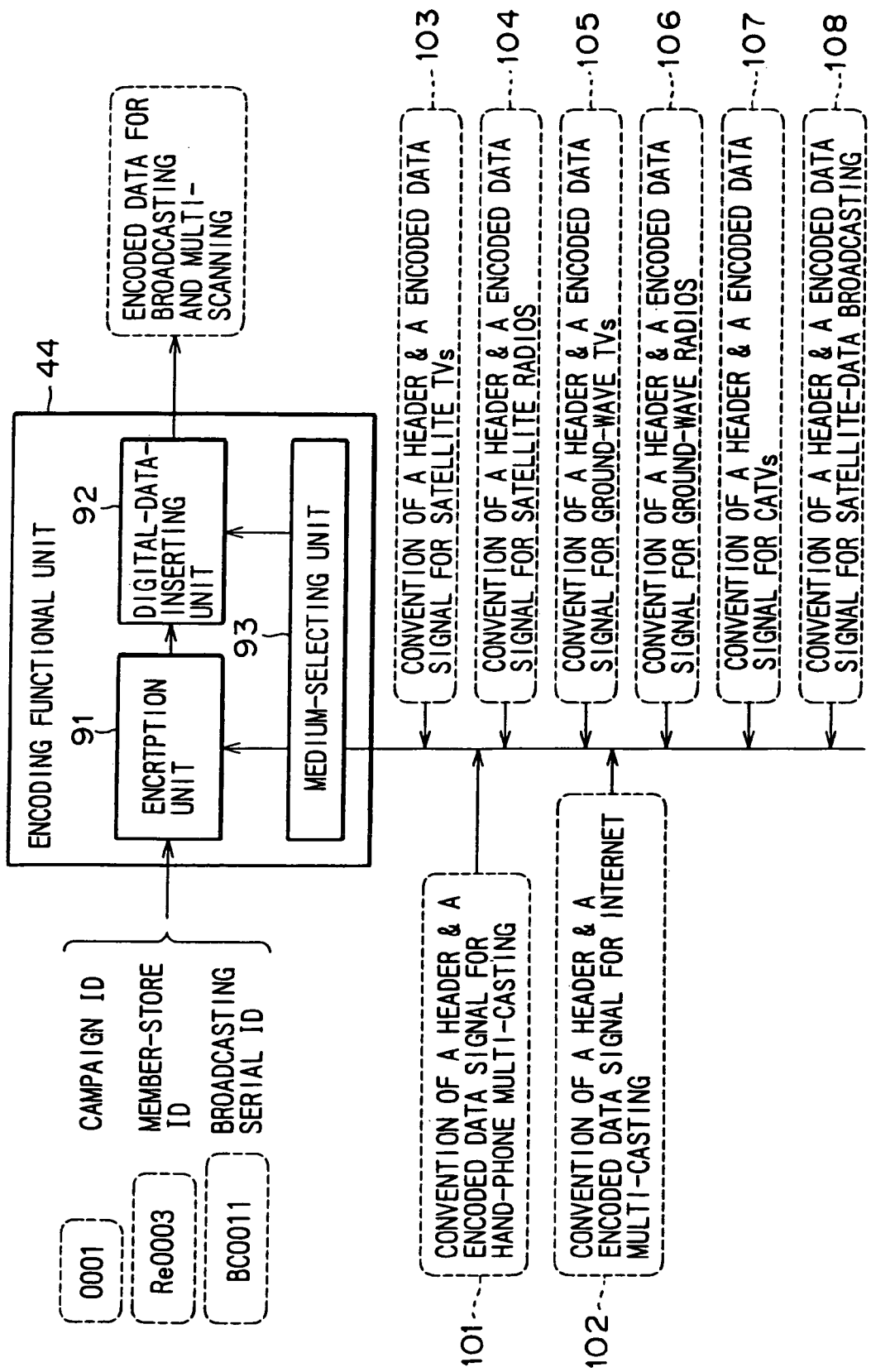
FIG. 14 is an explanatory diagram showing a more detailed functions of a tagging functional unit employed in the information processing system shown in FIG. 2.

FIG. 14 is a diagram showing a model of a encoding process carried out by the encoding functional unit 44. As shown in the figure, in the encoding functional unit 44, an encryption unit 91 encrypts an input comprising a campaign ID of 0001, a member-store ID of Re0003 and a broadcasting reference ID of BC0011 on the basis of a convention input from a medium-selecting switch 93. In this embodiment, the convention is a selected one of a hand-phone multi-cast header & encoded data signal convention 101, an Internet multi-cast header & encoded data signal convention 102, a satellite television header & encoded data signal convention 103, a satellite radio header & encoded data signal convention 104, a ground-wave television header & encoded data signal convention 105, a ground-wave radio header & encoded data signal convention 106, a CATV header & encoded data signal convention 107 or a satellite-data broadcasting header & encoded data signal convention 108. In the case of the example shown in FIG. 1, encoded data is transmitted by satellite radio communication. Thus, the encryption is based on the satellite radio header & encoded data signal convention 104.

It should be noted that, in order to form a judgment as to whether or not data is correct in a self evaluation unit 153 to be explained later by referring to FIG. 15, self evaluation based on a checksum is carried out. The encoding functional unit 44 carries out also additional processing based on this checksum.

A digital-data-inserting unit 92 further inserts predetermined data based on a convention selected by the medium-selecting switch 93 into the data encrypted by the encryption unit 91. The digital-data-inserting unit 92 outputs a result of insertion to the broadcasting functional unit 45 employed in the broadcasting apparatus 5.

It should be noted that the encryption unit 91 can also be provided at a stage following the digital-data-inserting unit 92.

Figure 5:
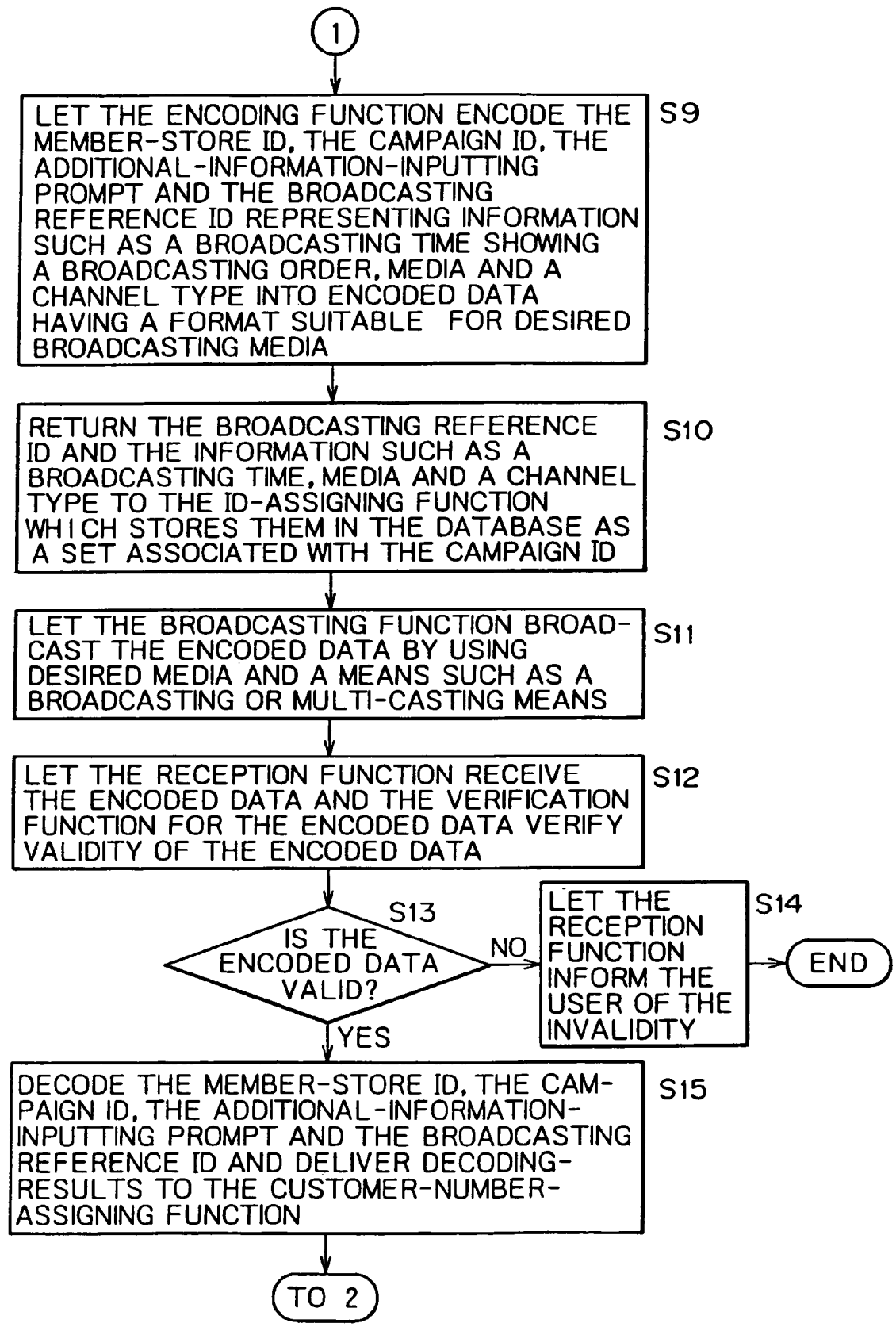
FIG. 5 is a continuation flowchart used for explaining processing carried out by the information processing system shown in FIG. 1.

At a step S10 of the flowchart shown in FIG. 5, the encoding functional unit 44 supplies the broadcasting reference ID allocated at the step S9 along with the corresponding information such as a broadcasting time, communication media and a channel type to the ID-assigning functional unit 42 which stores the broadcasting reference ID and the corresponding information in the database 43.

Typical data cataloged in the database 43 is shown in FIG. 12. As shown in the figure, broadcasting reference IDs BC0011, BC0012 and BC0023 are associated with campaign IDs 0001, 0002 and 0003 respectively. The broadcasting reference ID BC0011 is prescribed to have satellite radio communication media, a channel number of 112 and an output time of 2:30:45 to 2:30:55. On the other hand, the broadcasting reference ID BC0012 is prescribed to have satellite radio communication media, a channel number of 134 and an output time of 3:35:15 to 3:35:25.

As described above, a broadcasting serial ID is associated with information such as communication media, a channel number and an output time. As an alternative, the communication media, the channel number and the output time themselves are used as a broadcasting serial ID. It should be noted, however, that by prescribing a broadcasting serial ID in terms of a number or a symbol other than the communication media, the channel number and the output time, the table shown in FIG. 12 can be updated with ease.

At the next step S11, the encoding functional unit 44 transfers the encoded data to the broadcasting functional unit 45 employed in the broadcasting apparatus 5 by way of the Internet 1.

At the step S11, the broadcasting functional unit 45 employed in the broadcasting apparatus 5 digitally multiplexes the encoded data received from the encoding functional unit 44 with real audio data of the program by adopting a method such as a watermark technique and then transmits a result of multiplexing to the satellite 21 by way of the antenna 6. The result of multiplexing is eventually broadcasted to receivers 10 by the satellite 21. (The details of the watermark technique are described in the Japanese Patent Laid-Open No. 2000-68970.)

At the next step S12, the reception functional unit 51 employed in the receiver 10 receives the broadcasted encoded data from the broadcasting functional unit 45 and transfers the encoded data to the decoding functional unit 52. The decoding functional unit 52 examines a checksum added to the encoded data in order to verify the validity of the encoded data. At the next step S13, the decoding functional unit 52 forms a judgment as to whether the encoded data are valid or invalid. If the encoded data are determined to be invalid, the flow of the operations goes on to a step S14 at which the content recipient is informed of the invalidity. The notice is given to the content recipient typically as a voice message output by the speaker 237 or a visible indicator output by a display control unit 248.

If the outcome of the judgment formed at the step S113 indicates that the encoded data are valid, on the other hand, the flow of the operations goes on to a step S15 at which the decoding functional unit 52 decodes the input encoded data, extracting the member-store ID, the campaign ID, the additional-information-inputting prompt and the broadcasting reference ID. The decoding functional unit 52 then transfers the member-store ID, the campaign ID, the additional-information-inputting prompt and the broadcasting reference ID to the customer-number-assigning functional unit 46 employed in the customer-number-assigning server 7 by way of the Internet 1.

Figure 15:
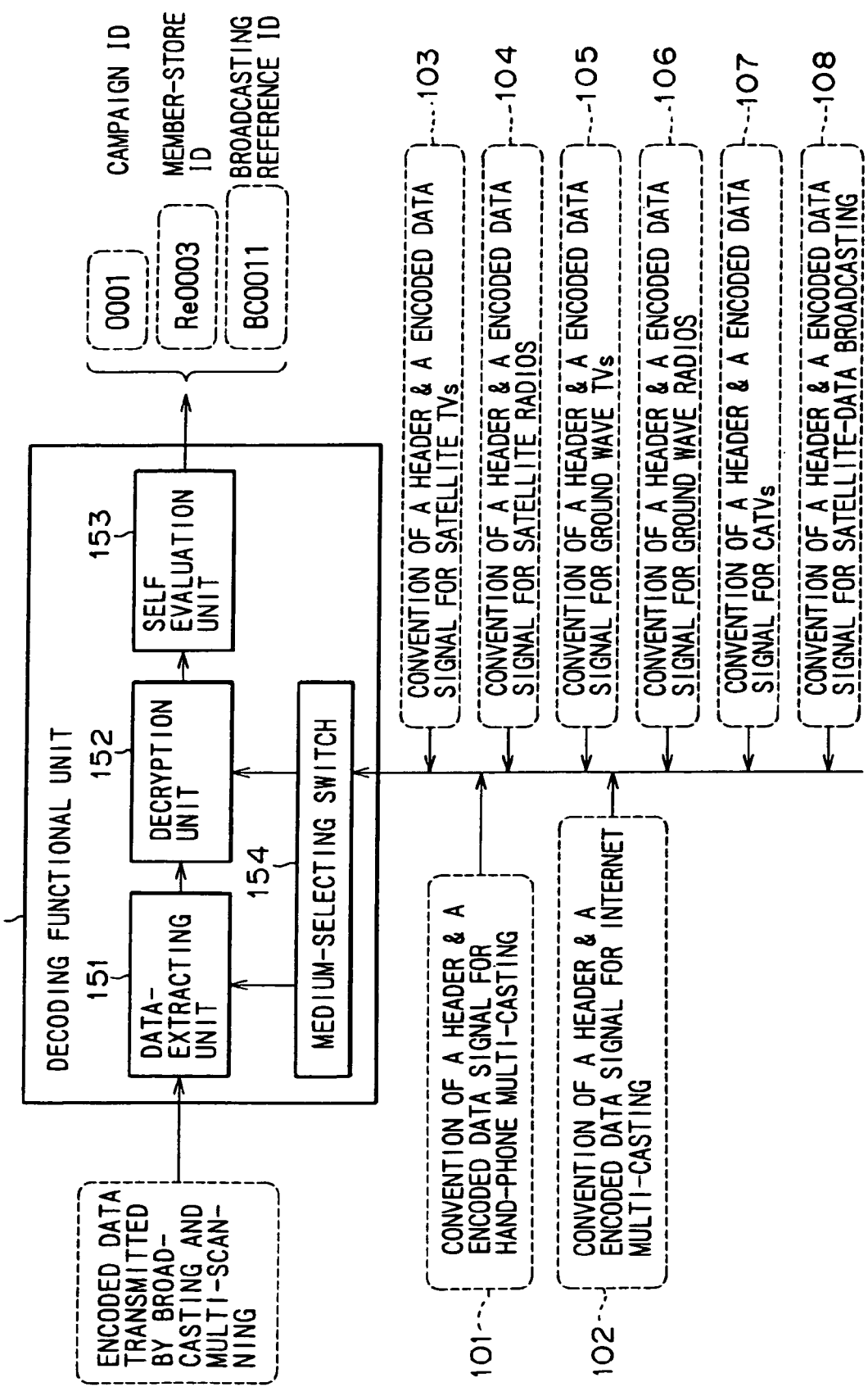
FIG. 15 is an explanatory diagram showing more detailed functions of a tag-decoding functional unit employed in the information processing system shown in FIG. 2.

FIG. 15 is a diagram showing a typical configuration of the decoding functional unit 52 which carries out the processing of the step S15. As shown in the figure, the decoding functional unit 52 includes a data-extracting unit 151 for receiving data input from the reception functional unit 51. The data-extracting unit 151 also receives a convention selected by a medium-selecting switch 154 among the hand-phone multi-cast header & encoded data signal convention 101 to the satellite-data broadcasting header & encoded data signal convention 108 which have been mentioned earlier by referring to FIG. 14. The data-extracting unit 151 extracts necessary information from the input data on the basis of the received convention and supplies the extracted information to a decryption unit 152.

The decryption unit 152 carries out decryption processing also based on the convention received from the medium-selecting switch 154. The decryption processing is a process opposite to the encryption carried out by the encryption unit 91 shown in FIG. 14. The decryption unit 152 outputs a result of decryption to a self evaluation unit 153 which carries out self evaluation on the decrypted data received from the decryption unit 152 by using a checksum in order to form a judgment as to whether the decrypted data is a correct or incorrect result of decryption. If the decrypted data is a correct result of decryption, the campaign ID of 0001, the member-store ID of Re0003 and the broadcasting reference ID of BC0011, which were input to the encryption unit 91 shown in FIG. 14, are acquired and transferred to the customer-number-assigning functional unit 46.

Figure 6:
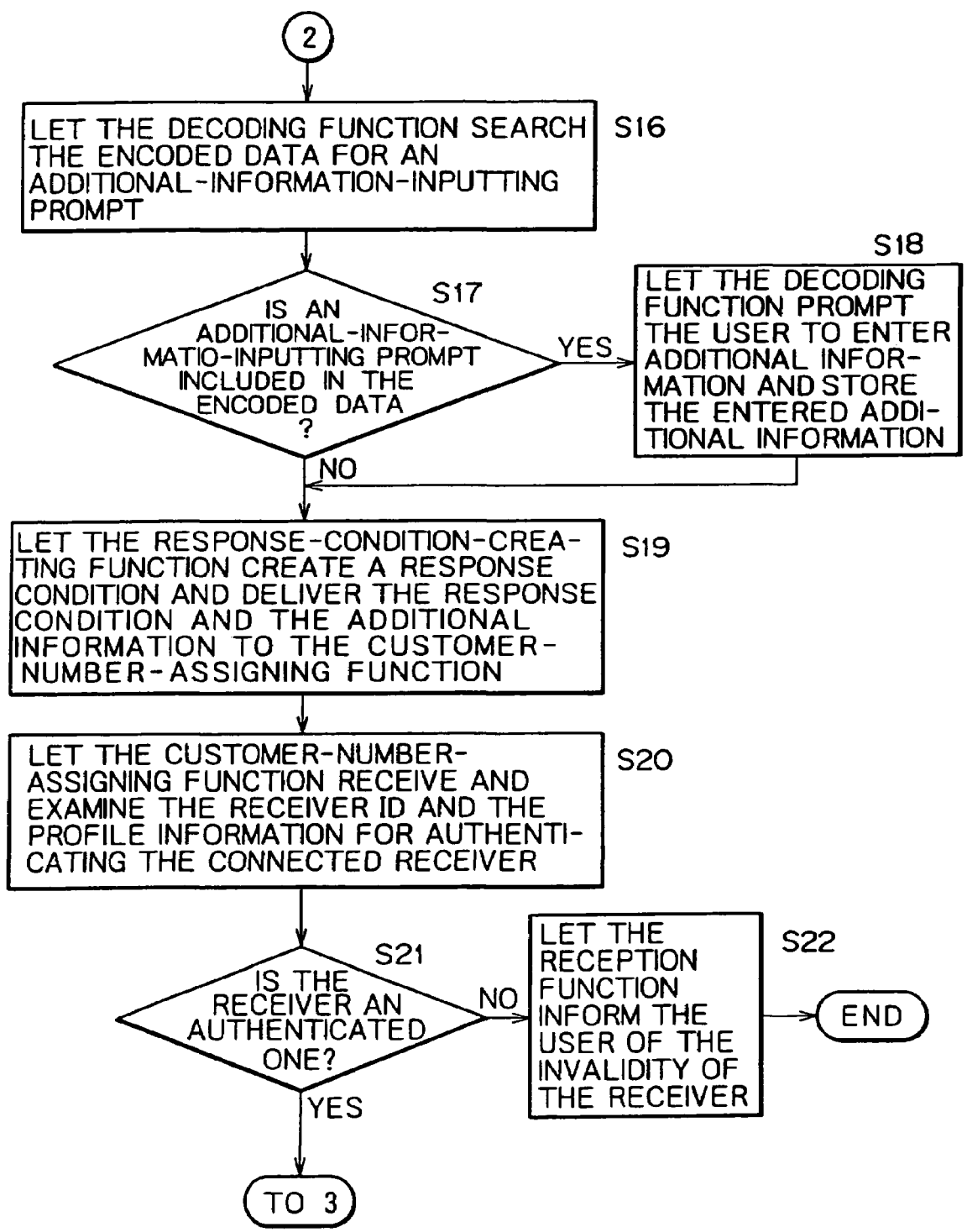
FIG. 6 is a continuation flowchart used for explaining processing carried out by the information processing system shown in FIG. 1.
Figure 7:
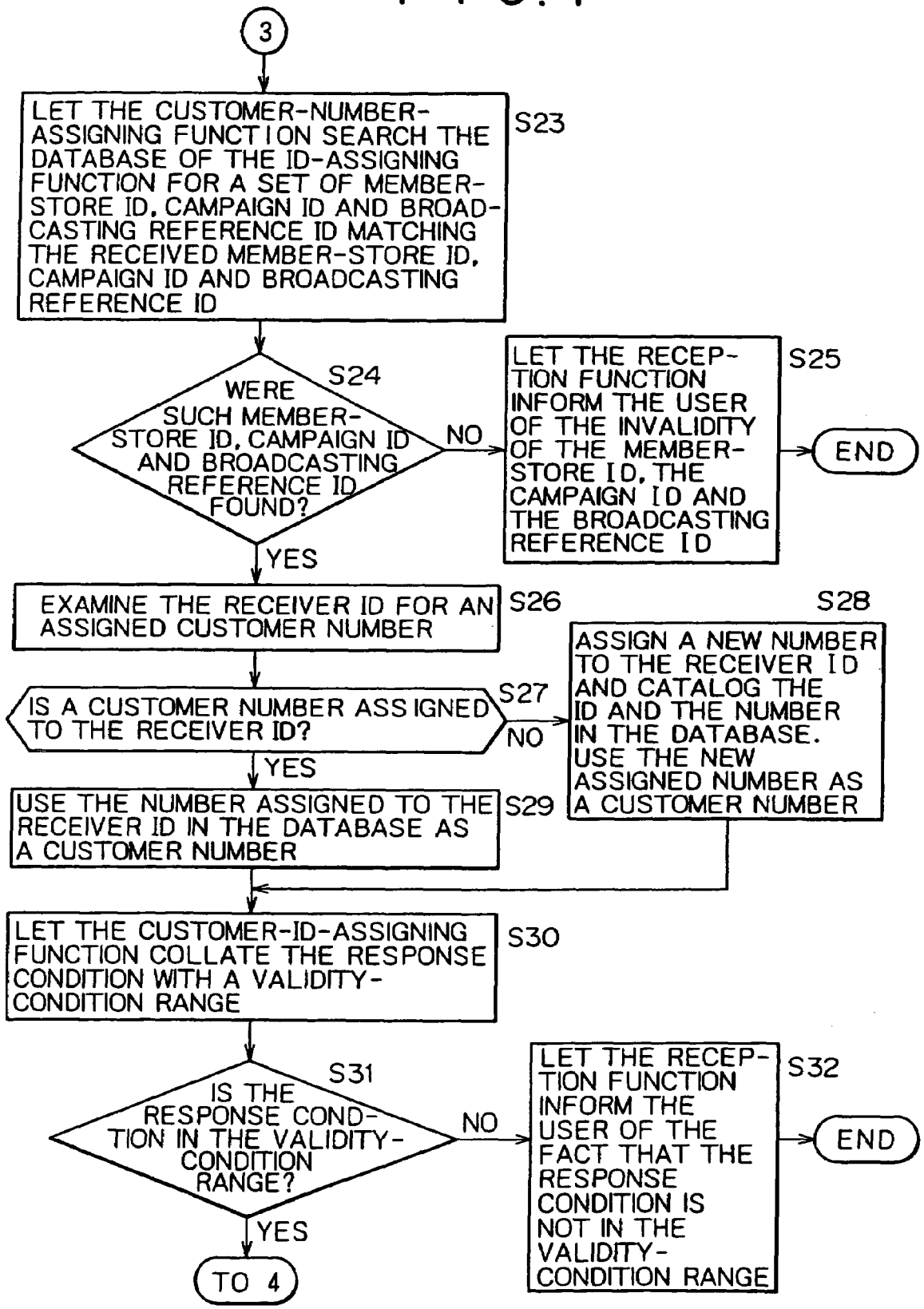
FIG. 7 is a continuation flowchart used for explaining processing carried out by the information processing system shown in FIG. 1.

Then, at a step S16 of the flowchart shown in FIG. 6, the decoding functional unit 52 searches the encoded data for an additional-information-inputting prompt. At the next step S17, the decoding functional unit 52 forms a judgment as to whether or not the encoded data include an additional-information-inputting prompt. If the encoded data include an additional-information-inputting prompt, the flow of the operations goes on to a step S118 at which the user (the content recipient) is prompted to enter additional information. The additional information entered by the user is stored. If the member-store functional unit 41 requests the user to enter additional information such as a response to a quiz, a response to a questionnaire, a number of a lottery, a password or the name of a commodity, a message is given to the user, requesting the user to enter such additional information. The additional information entered by the user in response to the message is stored in a memory.

If the outcome of the judgment formed at the step S17 indicates that the encoded data do not include an additional-information-inputting prompt, on the other hand, the processing of the step S118 is skipped.

If the outcome of the judgment formed at the step S17 indicates that the encoded data do not include an additional-information-inputting prompt, or after the processing of the step S18 is completed, the flow of the operations goes on to a step S19 at which the decoding functional unit 52 creates a response condition.

Figure 16:
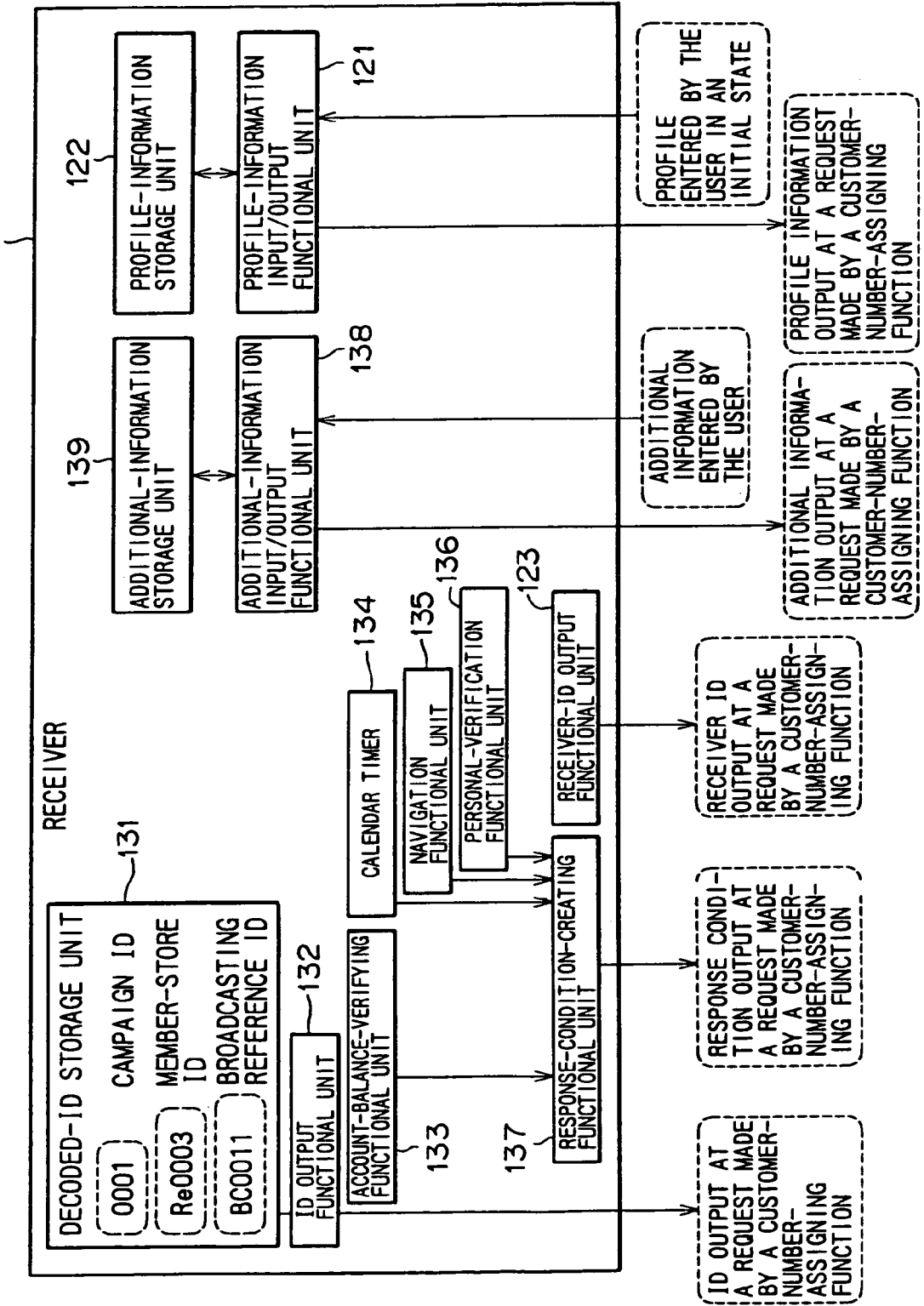
FIG. 16 is an explanatory diagram showing more detailed functions of a receiver employed in the information processing system shown in FIG. 2.

Processing to create a response condition is explained by referring to FIG. 16, which is a diagram showing functions related to the processing carried out by the receiver 10 to create a response condition.

In this embodiment, a static condition of personal information of a content recipient (a user) is treated as profile-information. On the other hand, a dynamic condition is treated as a response condition. A static condition is a condition that basically remains unchanged from input to input while a dynamic condition varies from input to input. A dynamic condition entered by the user from time to time is treated as additional information. Examples of the profile-information are a name, a gender, a postal address, an occupation, a cataloged territory, a payment means, an age and a consent condition. Profile-information is entered by the content recipient in advance through a profile-information input/output functional unit 121 and stored in a profile-information storage unit 122 in a typical format like one shown in FIG. 17. The consent condition is a condition on which presentation of profile-information of the content recipient to the member store providing a content is based. In the example shown in FIG. 17, the consent condition is prescribed as "Except adults" indicating that the content recipient does not allow the profile-information of the content recipient to be presented to a member store presenting adult contents. A customer number in the example shown in FIG. 17 indicates a customer number assigned to the customer by a predetermined store. This customer number is not a customer number assigned by the customer-number-assigning functional unit 46 to the customer as will be described later.

The profile-information stored in the profile-information storage unit 122 is supplied to the customer-number-assigning functional unit 46 by way of the profile-information input/output functional unit 121 to be stored in the database 49 employed therein. FIG. 18 is a diagram showing typical profile-information stored in the database 49. The substances of the profile-information stored in the database 49 are basically the same as those of the profile-information shown in FIG. 17. However, the profile-information shown in FIG. 18 includes a cataloging date, which is a date on which this profile-information is cataloged. In addition, the profile-information shown in FIG. 18 also includes a receiver-ID output by a receiver-ID output functional unit 123 employed in the receiver 10 to indicate that the profile-information is associated with the receiver-ID.

A decoded-ID storage unit 131 is used for storing a campaign ID, a member-store ID and a broadcasting reference ID, which are obtained as a result of decoding carried out by the decoding functional unit 52. If necessary, these IDs are supplied to the customer-number-assigning functional unit 46 by way of an ID output functional unit 132.

The receiver-ID output functional unit 123 supplies a receiver-ID stored in advance in the reception functional unit 51 to the customer-number-assigning functional unit 46 to be stored in the database 49 thereof. In the example show in FIG. 18, a receiver-ID of Ssny1003 is stored in the database 49, being associated with other pieces of profile-information.

The receiver 10 comprises an account-balance-verifying functional unit 133, a calendar timer 134, a navigation functional unit 135 and a personal-verification functional unit 136. The account-balance-verifying functional unit 133 checks a balance of an account owned by the content recipient. The calendar timer 134 generates the present time and the present date. The navigation functional unit 135 acquires the present position of the receiver 10. The personal-verification functional unit 136 recognizes the fingerprint, the eyes or the like of the operator of the receiver 10 in order to identify the operator. A response-condition-creating functional unit 137 creates a response condition from results of processing output by the account-balance-verifying functional unit 133, the calendar timer 134, the navigation functional unit 135 and the personal-verification functional unit 136.

FIG. 19 is a diagram showing a typical response condition created by the response-condition-creating functional unit 137. A response date and time included in the response condition are a date and a time at which a response is input. The creation of the response date and time is based on the present time and date of 10:13 and Oct. 3, 2001 generated by the calendar timer 134. The personal-verification functional unit 136 inputs images of the fingerprint and the eyes of the operator of the receiver 10, forming a judgment as to whether or not the images match those of a fingerprint and eyes stored in advance. If they match each other, a phrase of "A cataloged person" is included in the response condition.

An area detected by a navigation function is created on the basis of a present position detected by the navigation functional unit 135. In the example shown in FIG. 19, the present position is the state of California. A present balance of an account is created on the basis of a result of verification produced by the account-balance-verifying functional unit 133. In the example shown in FIG. 19, the account-balance-verifying functional unit 133 verifies the account balance of electronic money held in a memory employed in the receiver 10 to find out that the balance is 342 dollars.

When the user enters additional information, an additional-information input/output functional unit 138 takes in the information and stores it in an additional-information storage unit 139. This processing is carried out at the step S18 described earlier.

At the next step S19, the response-condition-creating functional unit 137 transfers the response condition thus created to the customer-number-assigning functional unit 46, or the additional-information storage unit 139 transfers additional information stored therein to the customer-number-assigning functional unit 46.

At the next step S20, the customer-number-assigning functional unit 46 examines the database 47 to determine whether or not the receiver 10 connected to the customer-number-assigning server 7 is cataloged in the database 47. As described above, the receiver 10 has transmitted a response condition and additional information to the customer-number-assigning functional unit 46. To put it in detail, the customer-number-assigning functional unit 46 issues an inquiry about the receiver-ID to the reception functional unit 51, and takes in the receiver-ID output by the receiver-ID output functional unit 123 in response to the inquiry. The customer-number-assigning functional unit 46 also issues a request for a transfer of profile-information to the profile-information storage unit 122 employed in the reception functional unit 51 through the profile-information input/output functional unit 121. The customer-number-assigning functional unit 46 compares the receiver-ID and the profile-information, which are taken in by the customer-number-assigning functional unit 46, with a receiver-ID and profile-information, which are stored in the database 47 in advance.

FIG. 20 is a diagram showing typical receiver-IDs stored in the database 47. In this cataloging example, cataloging dates of Jun. 5, 2000, Jun. 6, 2000 and Jun. 6, 2000, user names of Taro Tanaka, Jiro Yamada and Hanako Saito as well as model numbers of the receiver 10 of TS-S55, TS-S55 and TS-S55 are associated with receiver-IDs of Ssny1001, Ssny1003 and Ssny1004 respectively.

Then, at the next step S21, the customer-number-assigning functional unit 46 forms a judgment as to whether or not the received receiver-ID and the received profile-information are correct, that is, match respectively a receiver-ID and profile-information, which are stored in the database 47 in advance. If the received receiver-ID and the received profile-information are not correct ones, the flow of the operations goes on to a step S22 at which the user is informed of the invalidity through the reception functional unit 51.

If the outcome of the judgment formed at the step S21 indicates that the received receiver-ID and the received profile-information are correct ones, on the other hand, the flow of the operation goes on to a step S23 at which the customer-number-assigning functional unit 46 forms a judgment as to whether or not the member-store ID, the campaign ID and the broadcasting reference ID, which were received at the step S15 from the reception functional unit 51, match respectively the member-store ID, the campaign ID and the broadcasting reference ID, which were stored by the ID-assigning functional unit 42 in the processing carried out at the step S7. The broadcasting of the member-store ID, the campaign ID and the broadcasting reference ID, which were stored by the ID-assigning functional unit 42, was requested by the member-store functional unit 41. To put it in detail, the customer-number-assigning functional unit 46 issues an inquiry about a member-store ID and a campaign ID associated with the broadcasting reference ID to the ID-assigning functional unit 42 through the Internet 1. Then, the member-store ID, the campaign ID and the broadcasting reference ID, which are obtained as a response to the inquiry, are compared respectively with the member-store ID, the campaign ID and the broadcasting reference ID, which were received from the reception functional unit 51.

At the next step S24, the customer-number-assigning functional unit 46 forms a judgment as to whether or not these IDs are IDs stored in the database 43 of the ID-assigning functional unit 42 in advance, that is, whether the received IDs are correct ones. If the received receiver-ID and the received profile-information are not correct ones, the flow of the operations goes on to a step S25 at which the user is informed of the invalidity through the reception functional unit 51.

If the outcome of the judgment formed at the step S24 indicates that the received member-store, campaign and broadcasting reference IDs are correct ones, on the other hand, the flow of the operation goes on to a step S26 at which the customer-number-assigning functional unit 46 examines the database 43 for a receiver ID to which a customer number corresponding to a member-store ID being processed has not been assigned. The flow of the processing then goes on to a step S27 to form a judgment as to whether or not a customer number corresponding to a member-store ID being processed has not been assigned to a receiver ID. If a customer number corresponding to a member-store ID being processed has not been assigned to a receiver ID, the flow of the operation goes on to a step S28 at which the customer-number-assigning functional unit 46 assigns a new number corresponding to the member-store ID to the receiver ID and the receiver ID and the new number are stored in the database 47. The newly assigned number is used as a customer number for the member store.

In this way, a customer number is assigned to each user for each member store, making it possible to implement a function in which a house card is created for each member store. It should be noted that the customer number and the member-store ID can also be stored in the receiver 10.

If the outcome formed at the step S27 indicates that a customer number corresponding to a member-store ID being processed has been assigned to the receiver ID (a second of subsequent access made by the user), on the other hand, the flow of the processing goes on to a step S29 at which the customer-number-assigning functional unit 46 uses the number assigned to the receiver ID cataloged in the database 47 as a customer number.

After the processing of the step S28 or S29 has been completed, the flow of the processing goes on to a step S30. At the step S30, the customer-number-assigning functional unit 46 collates a response condition received from the response-condition-creating functional unit 137 at the step 19 with a validity condition cataloged in advance in the database 43 of the ID-assigning functional unit 42 at the step S7. That is to say, the customer-number-assigning functional unit 46 requests the ID-assigning functional unit 42 to transfer a validity condition for the broadcasting reference ID and, when the transferred validity condition is received, the response condition is compared with the validity condition.

Assume for example that a validity-condition with an entry number of 0003 shown in FIG. 13 has been cataloged in the database 43 for the campaign ID of 0003 or the broadcasting reference ID of BC0023. Now, also assume for example that the response condition shown in FIG. 19 is acquired. As shown in FIG. 19, the present account balance is 342 dollars, satisfying a validity-condition of 'At least 300 dollars' where the 300 dollars are the required minimum of the account balance.

In addition, a phrase of "The state of California" is prescribed as an area detected by a navigation function in the response condition shown in FIG. 19. Since the area restriction of the validity-condition shown in FIG. 13 is prescribed to be "California only", the area restriction of the validity-condition is also satisfied. As the restriction on the response date and time, a time and a date of 23:59 and Dec. 2, 2001 are prescribed in the validity-condition shown in FIG. 13, while a time and a date of 10:13 and Oct. 3, 2001 are prescribed in the response condition shown in FIG. 19 as a response time and a response date. Thus, this restriction on the response date and time itself is not satisfied. That is to say, the response is given after the response deadline. Since the validity-condition for the personal-verification function shown in FIG. 13 is prescribed to be 'not applicable' (NA), the person verified to be cataloged as shown in FIG. 19 is determined to satisfy this restriction on the user itself without regard to whether or not the user is cataloged.

On the basis of results of the examination described above, at the next step S31, the customer-number-assigning functional unit 46 forms a judgment as to whether or not the response condition falls within the range of the validity-condition. If the response condition does not fall within the range of the validity-condition, the flow of the operations goes on to a step S32 at which the user is informed of this dissatisfaction through the reception functional unit 51. Since the response condition shown in FIG. 19 does not satisfy the restriction on the response date and time of the validity-condition with an entry number of 0003 shown in FIG. 13, the outcome of the judgment formed at the step S31 indicates the dissatisfaction.

On the contrary, the response condition shown in FIG. 19 satisfies the validity-condition with an entry number of 0001 shown in FIG. 13. In this case, the flow of the operations goes on to a step S33 at which the customer-number-assigning functional unit 46 examines the additional information. At the next step S34, the customer-number-assigning functional unit 46 forms a judgment as to whether or not the additional information falls within the range of the validity-condition. In the case of the validity-condition with an entry number of 0001 shown in FIG. 13, for example, the correct answers of the additional information, that is, the correct responses to a quiz, are 'ABC cola' and 'ABC man'. If the user has entered answers other than the correct ones, the outcome of the judgment formed at the step S34 indicates that the additional information does not fall within the range of the validity-condition. In this case, the flow of the operations goes on to a step S35 at which the user is informed of this dissatisfaction by the customer-number-assigning functional unit 46 through the reception functional unit 51.

If the user has entered the correct answers, namely, the 2 phrases 'ABC cola', and 'ABC man' in responses to questions in the quiz, on the other hand, the outcome of the judgment formed at the step S34 indicates that the additional information does fall within the range of the validity-condition. In this case, the flow of the operations goes on to a step S36 at which the customer-number-assigning functional unit 46 examines the profile-information.

For example, assume that the profile-information of the user prescribes a phrase of 'Under 18 years old.' Since the validity-condition with an entry number of 0002 shown in FIG. 13 prescribes a phase of 'At least 18 years old,' the profile-information is determined to not fall within the range of the validity-condition. Even with the profile-information of the user prescribing a phrase of 'Over 18 years,' if the profile-information of the user prescribes a phrase of 'Except adults', the profile-information will be determined to not fall within the range of the validity-condition.

If the profile-information of the user prescribes a phrase of 'Over 18 years,' and does not prescribe a phrase of 'Except adults' as a restriction on the contents, which indicates that an adult content is prohibited, the profile-information will be determined to satisfy the range of the validity-condition.

Figure 8:
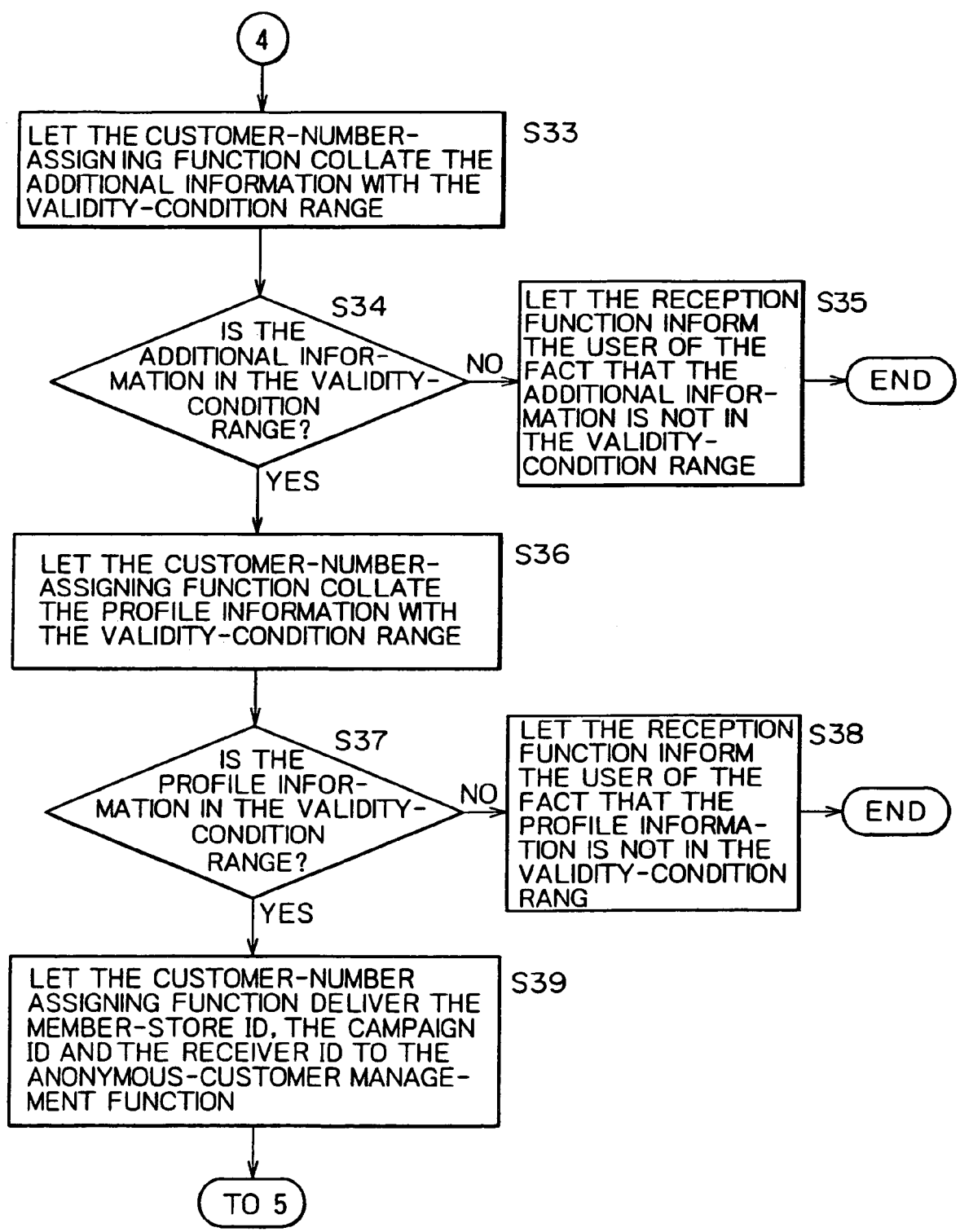
FIG. 8 is a continuation flowchart used for explaining processing carried out by the information processing system shown in FIG. 1.
Figure 9:
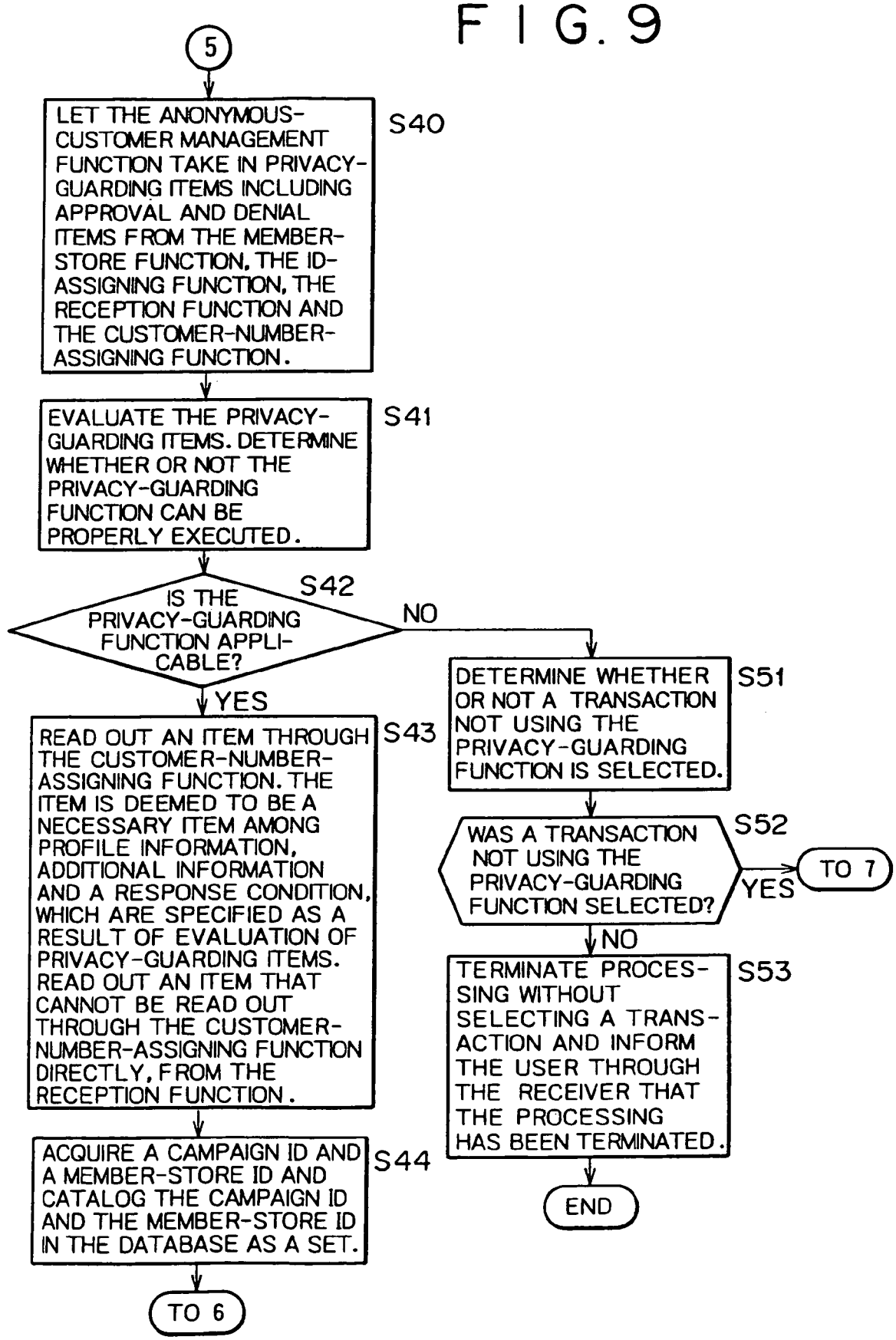
FIG. 9 is a continuation flowchart used for explaining processing carried out by the information processing system shown in FIG. 1.
Figure 10:
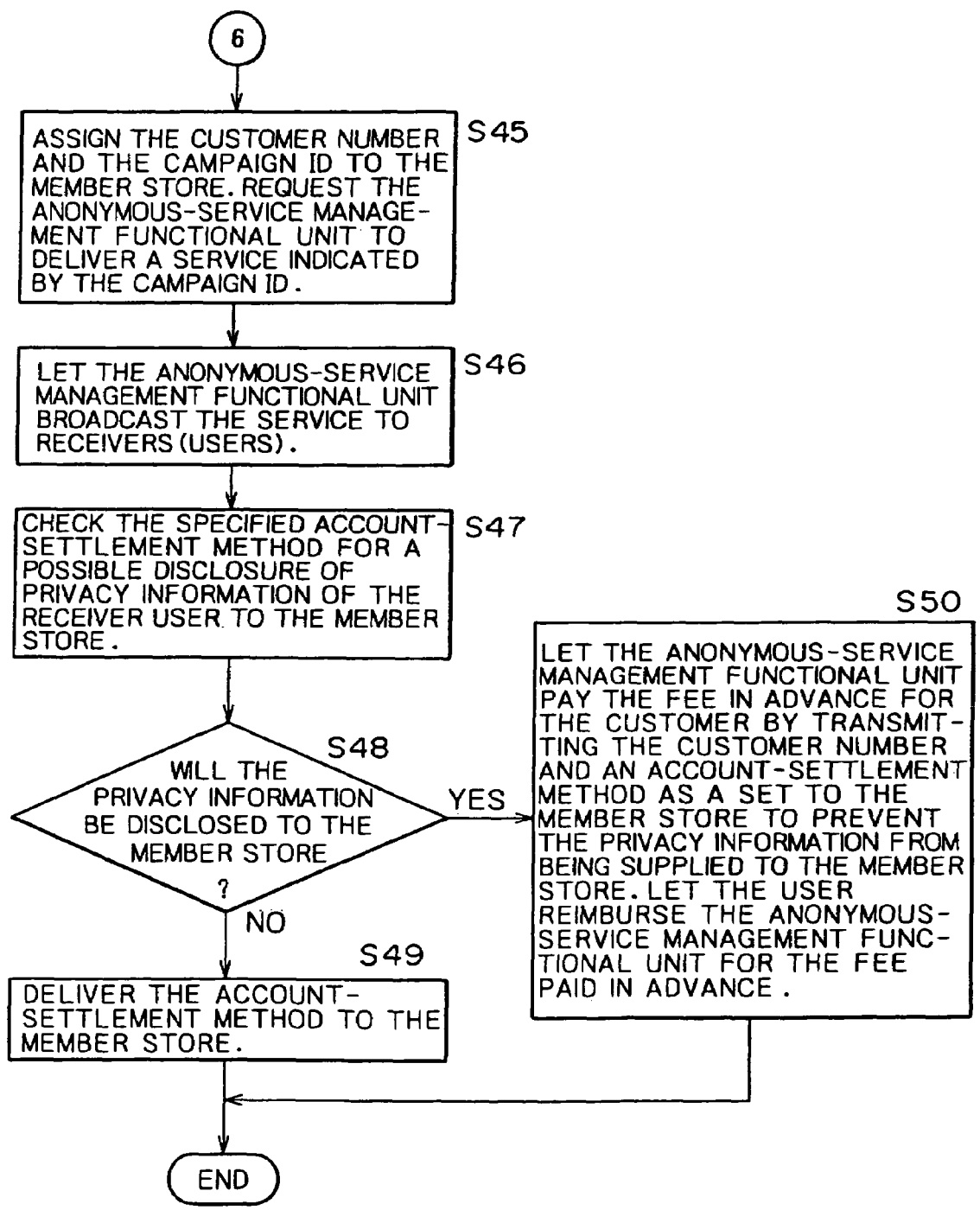
FIG. 10 is a continuation flowchart used for explaining processing carried out by the information processing system shown in FIG. 1.
Figure 11:
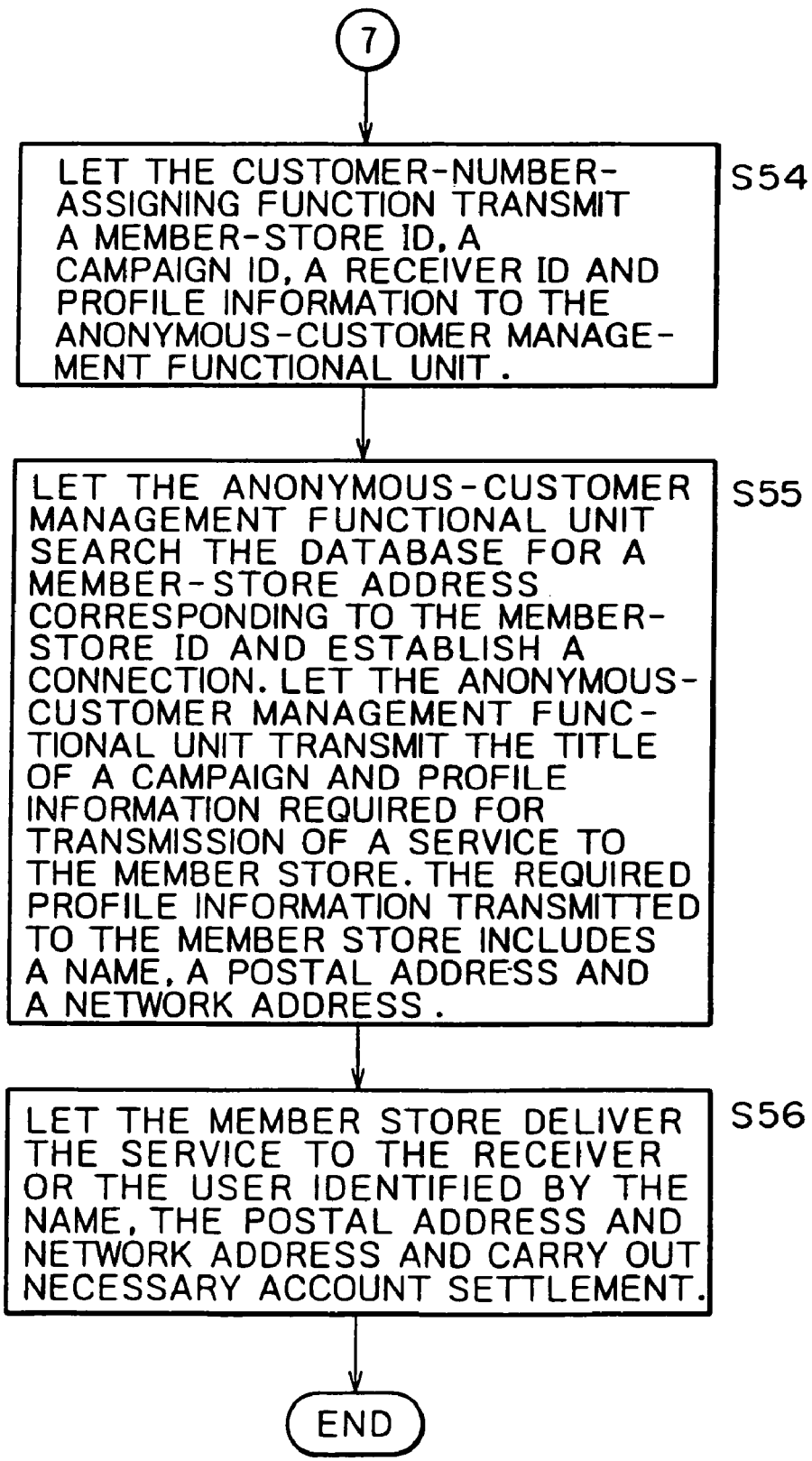
FIG. 11 is a continuation flowchart used for explaining processing carried out by the information processing system shown in FIG. 1.

At the next step S37 of the flowchart shown in FIG. 8, the customer-number-assigning functional unit 46 forms a judgment as to whether or not the profile-information of the user falls within the range of the validity-condition. If the profile-information is determined to not fall within the range of the validity-condition, the flow of the operations goes on to a step S38 at which the user is informed of the dissatisfaction through the reception functional unit 51. If the outcome of the judgment formed at the step S37 indicates that the profile-information falls within the range of the validity-condition, on the other hand, the flow of the operations goes on to a step S39 at which the customer-number-assigning functional unit 46 transmits the member-store ID, the campaign ID and the receiver-ID, which were received from the reception functional unit 51, to the anonymous-customer management functional unit 48 by way of the Internet 1.

At the next step S40, the anonymous-customer management functional unit 48 takes in privacy-guarding items from the member-store functional unit 41, the ID-assigning functional unit 42, the reception functional unit 51 and the customer-number-assigning functional unit 46.

Figure 21:
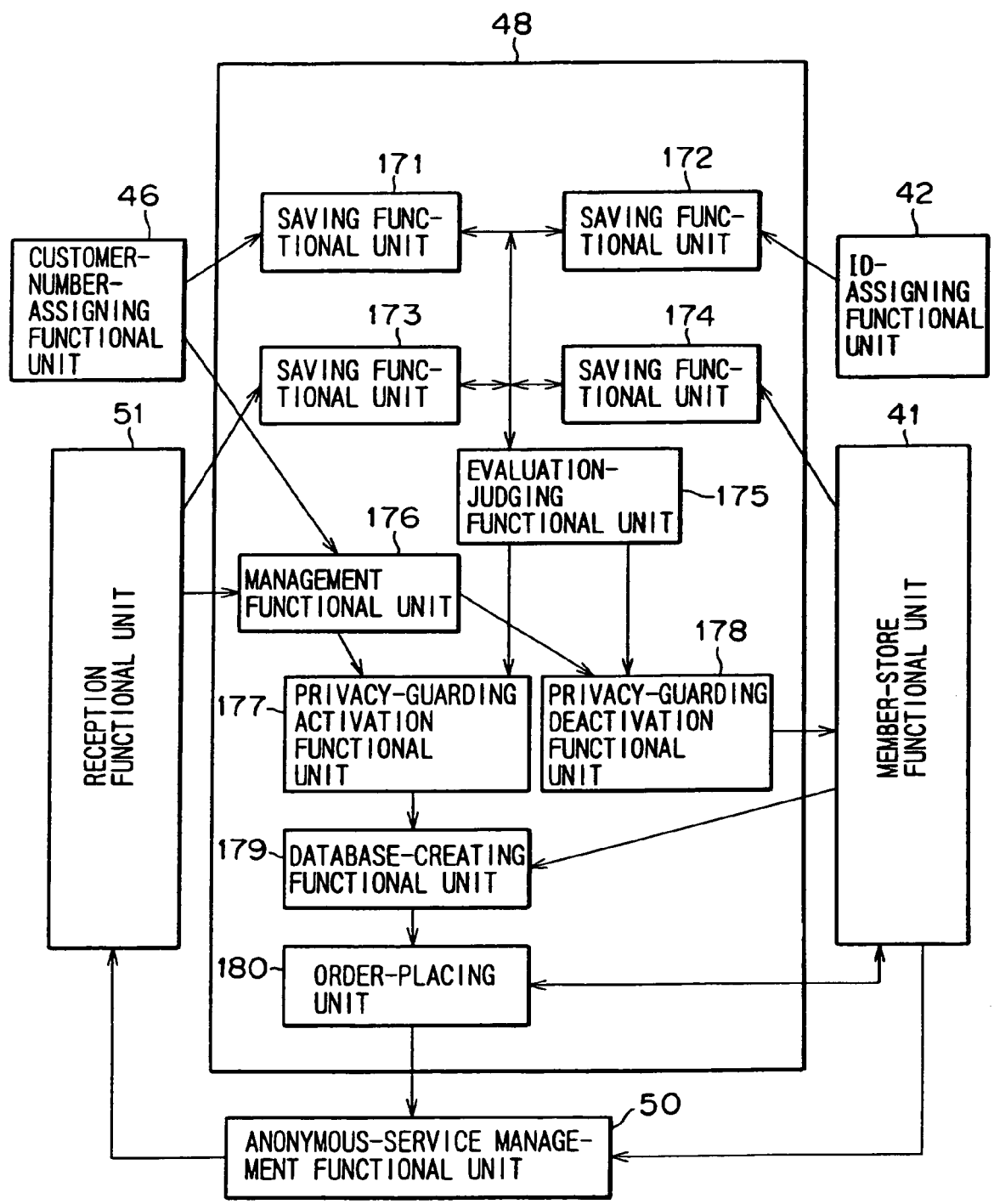
FIG. 21 is an explanatory diagram showing more detailed functions of a privacy-guarding functional unit employed in the information processing system shown in FIG. 2.

For this reason, as shown in FIG. 21, the anonymous-customer management functional unit 48 is provided with saving functional units 171 to 174, an evaluation-judging functional unit 175, a management functional unit 176, a privacy-guarding activation functional unit 177, a privacy-guarding deactivation functional unit 178, a database-creating functional unit 179 and an order-placing-unit 180.

The saving functional units 171, 172, 173 and 174 take in privacy-guarding items from the customer-number-assigning functional unit 46, the ID-assigning functional unit 42, the reception functional unit 51 and the member-store functional unit 41 respectively.

To put it in detail, trusted by the receiver 10 representing the user and the member-store server 2 representing the member store, the anonymous-customer management functional unit 48 presents a content supplied by the member store to the user and settles the account without giving the user's name, postal address and network address to the member store. Thus, while the user of the receiver 10 and the member store owning the member-store server 2 are of course capable of setting privacy-guarding items, in accordance with the present invention, the administrators of the ID-assigning server 3 and the customer-number-assigning server 7 are also capable of setting such items.

The privacy-guarding items are classified into fixed static items and dynamic items varying in dependence on conditions.

The user of the receiver 10 is capable of declaring that 'items such as a postal address, a name, an annual income, and a network address included in the user's own profile-information shall not be provided to any member store whatsoever without the user's consent' as a static privacy-guarding item. The fee for a presented content is paid through the anonymous-customer management functional unit 48 by using a means prescribed in an item for a normal payment means in the profile-information.

In addition, the receiver 10 is capable of setting an item varying in dependence on for example the rating of a member store as a dynamic privacy-guarding item. The rating of a member store is the category of the member store. For example, the rating of a member store is determined by the number of contents produced by the member store, determined by the amount of security money deposited with the customer-number-assigning server 7, or determined by the age range of users provided with contents, that is, determined by the category of the users such as high school students, university students or mature people.

With the rating of a member store set at a predetermined value of typically 3, the receiver 10 is capable of prescribing the following 2 privacy-guarding items without regard to whether or not setting of a privacy-guarding items prescribed by the member store exists.

1: Declaration of any of the profile-information, the additional information and the response condition as a privacy-guarding item that the receiver 10 is capable of presenting.

2: Declaration of any of a postal address, a name and a network address in the profile-information as a privacy-guarding item of the receiver 10 that needs to be protected by the anonymous-customer management functional unit 48 in reception of a presented content from a member store or declaration as to whether only broadcasting of contents is to be treated as an operation entrusted to the anonymous-customer management functional unit 48 or settlement of accounts is to be included in the operation entrusted to the anonymous-customer management functional unit 48.

With the rating of a member store set at a value other than a predetermined value of typically 3, the receiver 10 is capable of declaring that a request made by the member store for a privacy-guarding item is accepted as it is.

As an alternative, the receiver 10 declares that a privacy-guarding item be set so that an order be placed with a member store this time through a privacy-guarding function. In this way, the privacy-guarding function can be utilized on a case-by-case basis.

Examples of the static privacy-guarding items set by the member-store server 2 are the following two.

1: Declaration of any of the profile-information, the additional information and the response condition, which are generated by the receiver 10, as an item absolutely desired by the member store.

2: Declaration of any of a postal address, a name and a network address in the profile-information as a privacy-guarding item of the receiver 10 that needs to be protected by the anonymous-customer management functional unit 48 in presentation of a presented content to the user by a member store or declaration as to whether broadcasting of contents or settlement of accounts is to be treated as an operation entrusted to the anonymous-customer management functional unit 48.

Typical dynamic privacy-guarding items of the member-store server 2 are described as follows:

1: Declaration of any of the profile-information, the additional information and the response condition, which are generated by the receiver 10, as an item absolutely desired by the member store. If a portion showing the name of a country for the postal address included in the profile-information, which is an item absolutely desired by the member store, is a territorial range specified in advance by the member store, that is, if the country is Japan, for example, the following privacy-guarding item (2) is applicable. Otherwise, the following privacy-guarding item (3) is applicable.

2: Declaration of any of a postal address, a name and a network address in the profile-information as a privacy-guarding item of the receiver 10 that needs to be protected by the anonymous-customer management functional unit 48 in presentation of a presented content to the user by a member store or declaration as to whether broadcasting of contents or settlement of accounts is to be treated as an operation entrusted to the anonymous-customer management functional unit 48.

3: The member store does not allow the use of the anonymous-customer management functional unit 48 without regard to setting of a privacy-guarding item of the receiver 10. The member-store server 2 declares that no transaction is closed if a name, a postal address included in the profile-information of the receiver 10 is requested but the receiver 10 does not present the required item.

The member store is capable of making an appeal to users that privacy is protected by for example stating that privacy-guarding information is set so as to deliver a diet product Z to a customer through a privacy-guarding function operated by another company so that personal information of a customer placing an order for a diet product with this company is not received by this company.

As a static privacy-guarding item of the ID-assigning functional unit 42, for example, it is possible to declare that, without regard to setting of a privacy-guarding item by the member store, during a period from 13:00 PM to 20:00 PM on each Thursday, a privacy-guarding item set by the receiver 10 takes precedence of other items.

As a dynamic privacy-guarding item, for a rating of a member store set at a predetermined value of typically 3, the following privacy-guarding item 1-1 or 1-2 can be declared without regard to whether or not setting of a privacy-guarding item prescribed by the member store exists. For a rating of a member store set at a value other than the predetermined one, on the other hand, as a dynamic privacy-guarding item of the receiver 10, the following privacy-guarding item 2 can be declared.

1-1: Declaration of any of the profile-information, the additional information and the response condition, which are generated by the receiver 10, as an item absolutely desired by the member store.

1-2: Declaration of any of a postal address, a name and a network address in the profile-information as a privacy-guarding item of the receiver 10 to be protected by the anonymous-customer management functional unit 48 in presentation of a presented content by a member store or declaration as to whether broadcasting of contents or settlement of accounts is to be treated as an operation entrusted to the anonymous-customer management functional unit 48.

2: The member store does not allow the use of the anonymous-customer management functional unit 48 without regard to setting of a privacy-guarding item of the receiver 10. The member-store server 2 declares that no transaction is closed if a name and a postal address included in the profile-information of the receiver 10 is requested but the receiver 10 does not present the required item.

The ID-assigning functional unit 42 is capable of recruiting a number of member stores by for example making an appeal to the stores that a privacy-guarding item is set so that, in response to an order placed with a group U of member stores participating in this service and particularly handling adult commodities, the ordered content is delivered to the customer by using a privacy-guarding function in a uniform way so as to protect the confidentiality of the order.

If the customer-number-assigning functional unit 46 is capable of verifying a person specified in a response condition of the receiver 10, as a dynamic privacy-guarding item of the receiver 10, the following privacy-guarding item 1-1 or 1-2 can be declared without regard to the existence or non-existence of setting of privacy-guarding items prescribed by the member store. If the customer-number-assigning functional unit 46 is not capable of verifying a person specified in a response condition of the receiver 10, on the other hand, as a dynamic privacy-guarding item of the receiver 10, the following privacy-guarding item 2 can be declared.

1-1: Declaration of any of the profile-information, the additional information and the response condition, which are generated by the receiver 10, as an item that can be presented by the receiver 10.

1-2: Declaration of any of a postal address, a name and a network address in the profile-information as a privacy-guarding item of the receiver 10 desired by the user to be protected by the anonymous-customer management functional unit 48 in reception of a presented content from a member store or declaration as to whether broadcasting of contents or settlement of accounts is to be treated as an operation entrusted to the anonymous-customer management functional unit 48.

2: The receiver 10 is capable of declaring that a request made by the member store for a privacy-guarding item is accepted as it is without regard to setting of an ordinary privacy-guarding item.

The customer-number-assigning functional unit 46 is capable of prompting a number of users to utilize the service by for example making an appeal to the users that a privacy-guarding item is set so that, if the age information included in profile-information indicated by a cataloged receiver-ID is a phrase of "Under 18 years old", a content is delivered to the customer by using a privacy-guarding function in a uniform manner so as to protect the confidentiality of the order.

As described above, privacy-guarding items set by the customer-number-assigning functional unit 46, the ID-assigning functional unit 42, the reception functional unit 51 and the member-store functional unit 41 are stored by the saving functional units 171 to 174. Thus, at a step S41 of the flowchart shown in FIG. 9, the evaluation-judging functional unit 175 employed in the anonymous-customer management functional unit 48 evaluates the privacy-guarding items, determining whether or not the privacy-guarding functions can be properly executed. That is to say, if a declared privacy-guarding item is contradictory, its privacy-guarding function cannot be applied. For example, as described above, if the member-store functional unit 41 makes a request for presentation of profile-information by the reception functional unit 51 but cannot receive the presentation, the fact that a content cannot be presented is declared and, in addition, if there is a limitation that the reception functional unit 51 is not capable of presenting profile-information requested by a member store, a privacy-guarding function cannot be applied. If the receiver 10 consents to presentation of profile-information requested by the member store, on the other hand, a privacy-guarding function can be applied.

Thus, at the next step S42, the evaluation-judging functional unit 175 employed in the anonymous-customer management functional unit 48 forms a judgment as to whether a privacy-guarding function can or cannot be applied. If a privacy-guarding function can be applied, the flow of the operations goes on to a step S43. At the step S43, the management functional unit 176 reads out an item from the customer-number-assigning functional unit 46. The item is deemed to be necessary among profile-information, additional information and a response condition, which are specified as a result of evaluation of privacy-guarding items. An item that cannot be read out from the customer-number-assigning functional unit 46 is read out from the reception functional unit 51.

At the next step S44, the privacy-guarding activation functional unit 177 employed in the anonymous-customer management functional unit 48 supplies the item read out by the management functional unit 176 at the step S43 to the database-creating functional unit 179. The database-creating functional unit 179 stores the item in the database 49 by associating the item with a campaign ID, a member-store ID and a customer number associated with a broadcasting reference ID of interest.

FIG. 22 is a diagram showing typical cataloging of data in the database 51. In this example, the cataloged data is a name, a postal address, a network address, a method of account-settlement and a customer number.

At the next step S45, the order-placing-unit 180 employed in the anonymous-customer management functional unit 48 transmits the customer number and the campaign ID to the member-store functional unit 41 by way of the Internet 1 to request the member-store functional unit 41 that a content indicated by the campaign ID be broadcasted to the order-placing-unit 180 of the anonymous-customer management functional unit 48. The member-store functional unit 41 transmits the content to the order-placing-unit 180 as requested and the order-placing-unit 180 receives the content. At the next step S46, the content is directly passed on to the reception functional unit 51. If the content is information that can be transmitted through the Internet 1, the content is transmitted to the reception functional unit 51 through the Internet 1.

The content may be held not by the member-store functional unit 41 but by the anonymous-service management functional unit 50 employed in the anonymous-service management server 9. In this case, the member-store functional unit 41 requests the order-placing-unit 180 to issue a request for the content to the anonymous-service management functional unit 50. In accordance with this request, the order-placing-unit 180 supplies information required for transmission of the content to the anonymous-service management functional unit 50 to request the anonymous-service management functional unit 50 that a content be transmitted to the reception functional unit 51. The information includes the user's postal address, name and network address. As requested, the anonymous-service management functional unit 50 transmits the content to the reception functional unit 51. That is to say, the order-placing-unit 180 transmits the content indirectly to the reception functional unit 51 in this case.

Then, at the next step S47, the order-placing-unit 180 searches privacy-guarding information, broadcasting of which is prohibited by the user, for an account-settlement method specified by the user. This is because it is quite within the bounds of possibility that the account-settlement method supposed to be protected by the privacy-guarding information is supplied to the member store. At the next step S48, the order-placing-unit 180 forms a judgment as to whether or not it is quite within the bounds of possibility that the account-settlement method supposed to be protected by the privacy-guarding information is supplied to the member store. If it is quite within the bounds of possibility that the account-settlement method supposed to be protected by the privacy-guarding information is supplied to the member store, the flow of the operations goes on to a step S50 at which the order-placing-unit 180 pays the fee in advance for the customer by transmitting the customer number and an account-settlement method to the member-store functional unit 41 as a set in order to prevent the privacy-guarding information from being supplied to the member store. The account-settlement method transmitted to the member-store functional unit 41 is a method applied by the order-placing-unit 180 to the member-store functional unit 41 and not the account-settlement method specified by the user. Thus, even if the account-settlement method adopted by the order-placing-unit 180 is transmitted to the member-store functional unit 41, the privacy information of the user does not leak out.

The order-placing-unit 180 also settles an accurate account of the reception functional unit 51 for the advance payment made to the member-store functional unit 41. The user of the reception functional unit 51 then makes a payment to the order-placing-unit 180.

If the outcome of the judgment formed at the step S48 indicates that informing the member store of the account-settlement method specified by the user does not necessarily mean disclosure of privacy information to the provider, on the other hand, the flow of the operations goes on to a step S49 at which the order-placing-unit 180 transfers the account-settlement method specified by the user to the member-store functional unit 41. In this case, the member-store functional unit 41 issues a request for a payment of the fee to the user of the reception functional unit 51 on the basis of the account-settlement method of the user received from the order-placing-unit 180.

If the outcome of the judgment formed at the step S42 indicates that a privacy-guarding function cannot be applied, on the other hand, the flow of the operations goes on to a step S51 at which the evaluation-judging functional unit 175 examines use of a privacy-guarding function in a transaction. At the next step S52, the evaluation-judging functional unit 175 forms a judgment as to whether or not a transaction not using a privacy-guarding function has been selected. Assume for example that it is known that the user does not want any transaction not using a privacy-guarding function, that is, the user always wants only a transaction using a privacy-guarding function, and it is known that, as a result of evaluation of a privacy-guarding item at the step S41, the outcome of the judgment formed at the step S42 indicates disagreement with a privacy-guarding item presented by the member store. In this case, the transaction can not be settled.

In this case, the flow of the operations goes on from the step S52 to a step S53 at which the evaluation-judging functional unit 175 terminates processing without selecting a transaction and informs the user through the receiver that the processing has been terminated.

If the outcome formed at the step S52 indicates that a transaction not using a privacy-guarding function has been selected, on the other hand, the flow of the operations goes on to a step S54 at which the privacy-guarding deactivation functional unit 178 employed in the anonymous-customer management functional unit 48 notifies the customer-number-assigning functional unit 46 that a privacy-guarding function is not used. At the step S54, the customer-number-assigning functional unit 46 informed of the fact that a privacy-guarding function is not used transmits a member-store ID, a campaign ID, a receiver-ID and profile-information to the ID-assigning functional unit 42 employed in the ID-assigning server 3 by way of the Internet 1. At the next step S55, the ID-assigning functional unit 42 searches the database 43 employed in the ID-assigning functional unit 42 for a member store network address corresponding to the member-store ID received at the step S54, and uses the network address of the member store to establish a connection to the member-store functional unit 41 through the Internet 1. Then, the ID-assigning functional unit 42 transmits the title of a campaign and profile-information required for transmission of the content to the member-store functional unit 41, requesting the member-store functional unit 41 to present the content. The required profile-information transmitted to the member-store functional unit 41 includes a name, a postal address and a network address.

At the next step S56, the member-store functional unit 41 delivers the specified content to a user specified by the ID-assigning functional unit 42. Then, the member-store functional unit 41 carries out necessary processing to settle an account with the user of the receiver 10.

Figure 23:
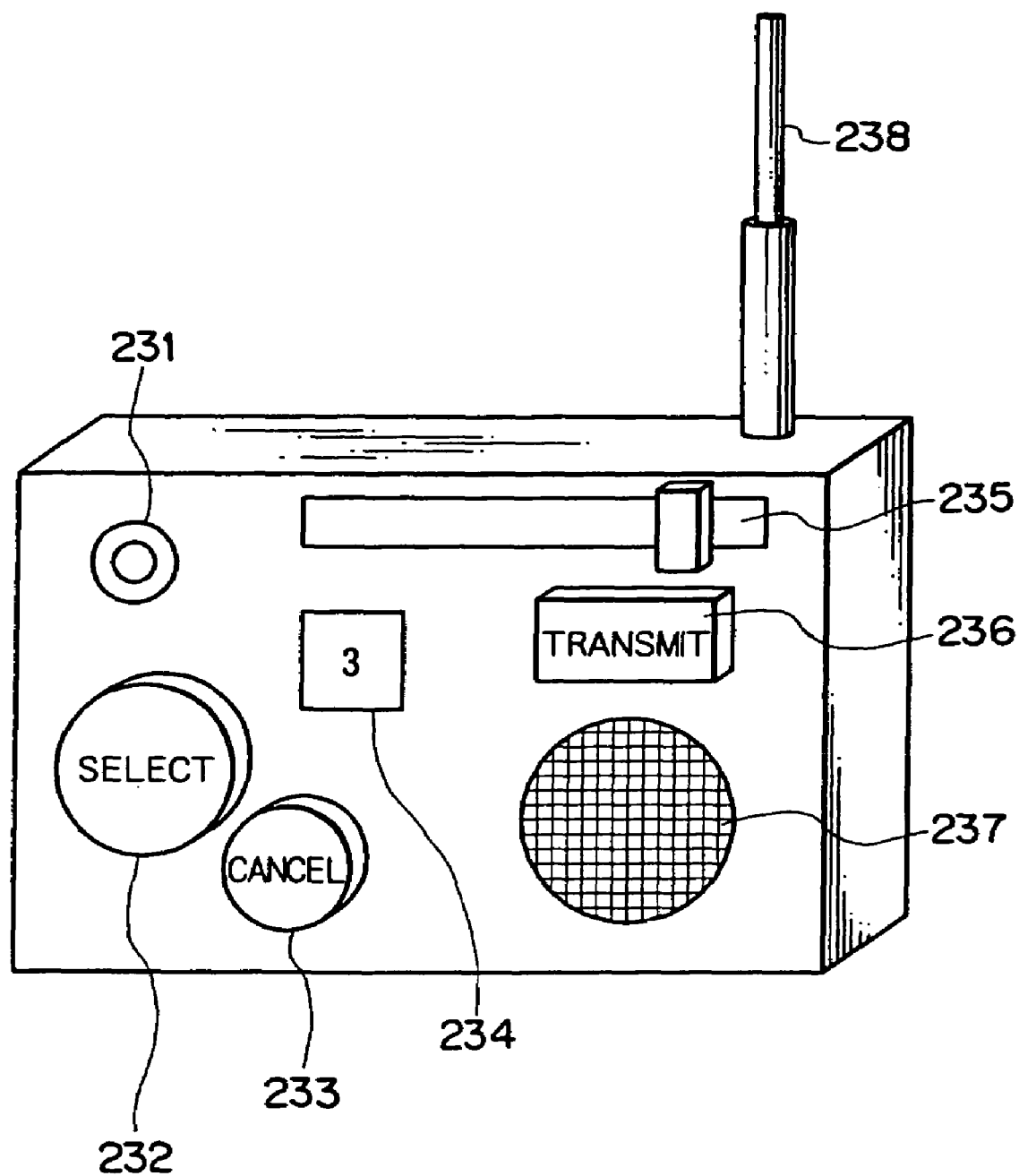
FIG. 23 is a diagram showing an external view of a typical configuration of the receiver employed in the information processing system shown in FIG. 1.
Figure 24:
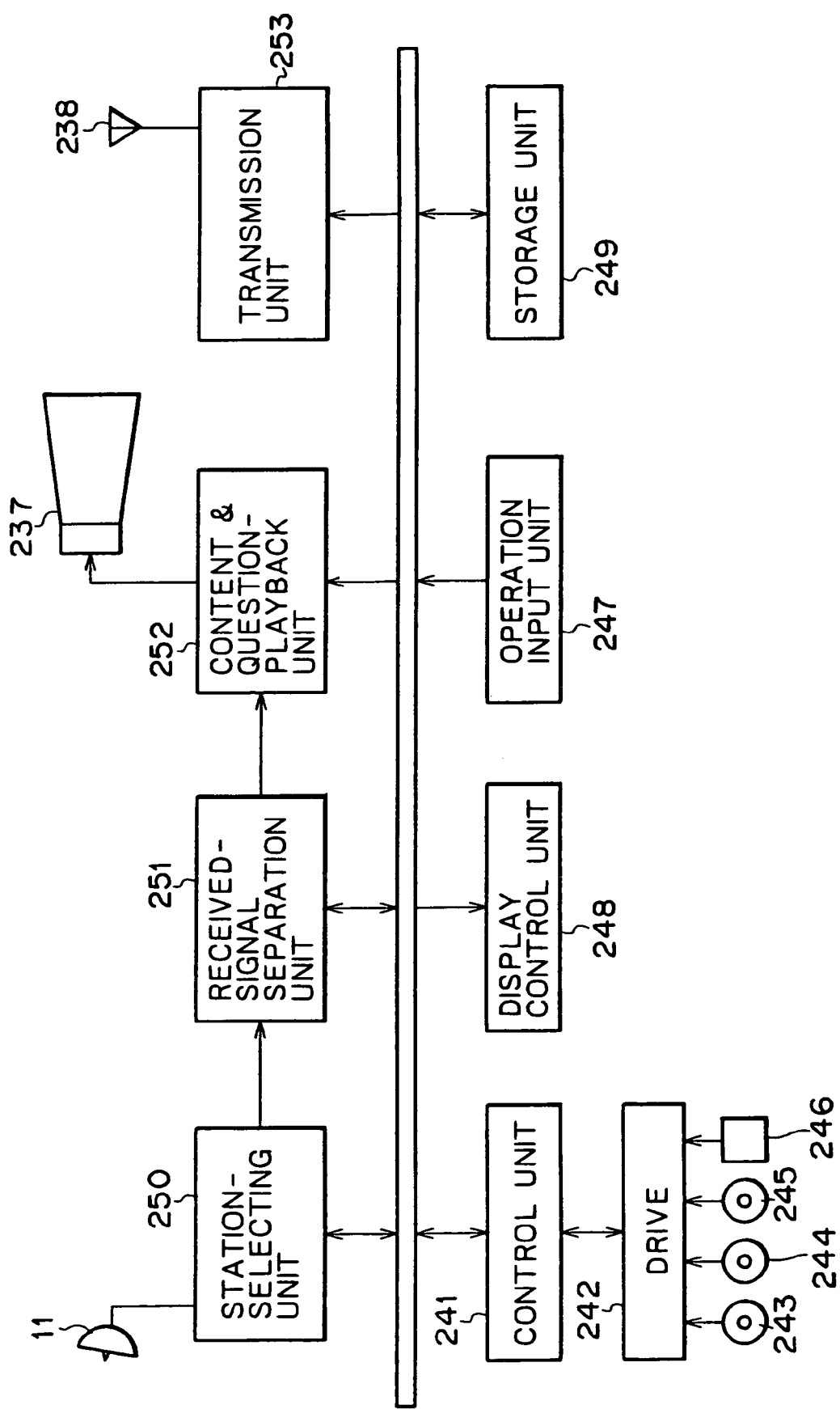
FIG. 24 is a diagram showing a typical electrical configuration of the receiver shown in FIG. 23.

Next, a concrete typical configuration of the receiver 10 is explained by referring to FIGS. 23 and 24.

FIG. 23 is a diagram showing an external view of a typical configuration of the receiver 10. An active indicator 231 is turned on when a select button 232 and a cancel button 233 are put in an operatable state by an activate signal received from the broadcasting apparatus 5. On the other hand, the active indicator 231 is turned off when the select button 232 and the cancel button 233 are put in an unoperatable state by a deactivate signal received from the broadcasting apparatus 5.

The select button 232 is used by the user (the content recipient) to enter a response to a broadcasted question. To be more specific, a number entered as a response is incremented by 1 each time the select button 232 is pressed. The number of times the select button 232 was pressed so far is displayed on a select count display window 234. The value of a response entered by pressing the select button 232, that is, a value displayed on the select count display window 234, is decremented by 1 each time the cancel button 233 is pressed.

In order to enter the number 3 as a response to a question, for example, the user needs to press the select button 232 three times. If the user presses the select button 232 four times by mistake, for example, the user needs to press the cancel button 233 once. At that time, the select count display window 234 once displays the number 4 and eventually displays a final answer of 3 (=4−1).

It should be noted that a response to a question displayed on the select count display window 234 is stored in a storage unit 249 shown in FIG. 24, being associated with the question ID of the question.

If a content data sale service is rendered through radio broadcasting, for example, the select button 232 is also pressed to make a request for downloading or recording of content data. The content data sale service is a service to sell compressed and encoded data of music broadcasted as an audio signal by multiplexing the data in a broadcasted signal. The compressed and encoded data is obtained as a result of encryption. In this case, if the cancel button 233 is pressed, the request for downloading or recording of content data is canceled.

A campaign ID identifying content data downloaded by an operation to press the select button 232 is stored in the storage unit 249 shown in FIG. 24 much like a response to a question and other data. The campaign ID is embedded in the broadcasted signal.

A tuning slide 235 is operated to select a radio broadcasting station, a broadcast of which is to be received.

A transmit button 236 is pressed to set the receiver 10 in a response data transmission-mode. To put it concretely, the transmit button 236 is pressed to transmit a question ID stored in the storage unit 249 and data such as a response associated with the question ID to the customer-number-assigning server 7. The transmit button 236 is also pressed to indicate a desire to purchase a decryption key of downloaded encrypted data. That is to say, the transmit button 236 is pressed to make a request for a transfer of the decryption key.

A speaker 237 outputs voices and sounds of a radio program. An antenna 238 transmits a radio signal conveying a question ID stored in the storage unit 249 and data such as a response associated with the question ID.

FIG. 24 is a diagram showing a typical electrical configuration of the receiver 10. A control unit 241 employed in the receiver 10 controls a drive 242 to read out a control program from a magnetic disk 243, an optical disk 244, a magnetic optical disk 245 or a semiconductor memory 246. The control unit 241 also controls other components composing the receiver 10 on the basis of operation information entered by the user via an operation input unit 247 by execution of the control program read out by the drive 242.

When an activate signal is received by a received-signal separation unit 251, for example, the control unit 241 controls a display control unit 248 to turn on the active indicator 231 and controls an operation input unit 247 to detect an operation to press the select button 232 or the cancel button 233. When a deactivate signal is received by the received-signal separation unit 251, on the other hand, the control unit 241 controls the display control unit 248 to turn off the active indicator 231 and controls the operation input unit 247 to ignore an operation to press the select button 232 or the cancel button 233.

The operation input unit 247 detects an operation carried out by the user on the select button 232, the cancel button 233, the tuning slide 235 or the transmit button 236 and outputs information on the operation to the control unit 241. Controlled by the control unit 241, the display control unit 248 controls operations to turn on or off the active indicator 231 and to display information on the select count display window 234.

The storage unit 249 is used for storing a response, a question ID, and the address of a response-collecting apparatus supplied thereto by operating the select button 232 and the cancel button 233 as a set. The storage unit 249 is also used for storing a unique receiver-ID assigned to the receiver 10. It should be noted that the receiver-ID is not only used for identifying the receiver 10, but also used by an administrator for identifying the user through management executed by associating the receiver-ID with the profile of the user. In addition, the storage unit 249 is also used for storing downloaded content data, that is, compressed and encoded data of music and the like. It should be noted that the storage unit 249 can be integrated with the magnetic disk 243, the optical disk 244, the magnetic optical disk 245 or the semiconductor memory 246 into a single unit.

Controlled by the control unit 241, a station-selecting-unit 250 receives a signal broadcasted by a radio broadcasting station selected by the user by operating the tuning slide 235 and supplies the signal to a received signal separation unit 251. Also controlled by the control unit 241, the received-signal separation unit 251 separates an audio signal from the broadcasted signal and outputs the audio signal to a content & question-playback unit 252. The received-signal separation unit 251 also separates signals other than the audio signal and a content from the broadcasted signal and supplies the other signals to the control unit 241. The other signals include a question ID, the network address of a customer-number-assigning server 7 to receive a response from the user, an activate or deactivate signal and a decryption key. In addition, the received-signal separation unit 251 separates the content from the broadcasted signal and supplies the content to the storage unit 249.

The content & question-playback unit 252 plays back an audio signal received from the received-signal separation unit 251 and outputs a signal obtained as a result of the playback operation to the speaker 237. In addition, the content & question-playback unit 252 also decodes encrypted content data read out from the storage unit 249 by using a decryption key received from the control unit 241, plays back a result of decoding and outputs a signal obtained as a result of the playback operation to the speaker 237. The encrypted content data read out from the storage unit 249 is compressed and encoded data of music or the like.

A communication unit 253 has a function equivalent to the data communication function of a hand phone or a PHS (Personal Handyphone System). Controlled by the control unit 241, the communication unit 253 reads out a data set comprising a response, a question ID and the network address of a response-collecting apparatus from the storage unit 249, adds the receiver-ID to the response and the question ID, and transmits the response, the question ID and the receiver-ID to the network address of the response-collecting apparatus as a radio signal. In addition, also on the basis of control executed by the control unit 241, the communication unit 253 transmits information for applying for a purchase of a decryption key for decoding encrypted content data stored in the storage unit 249 to the broadcasting apparatus 5 as a radio signal. In actuality, the information comprises a campaign ID and a receiver-ID.

Figure 25:
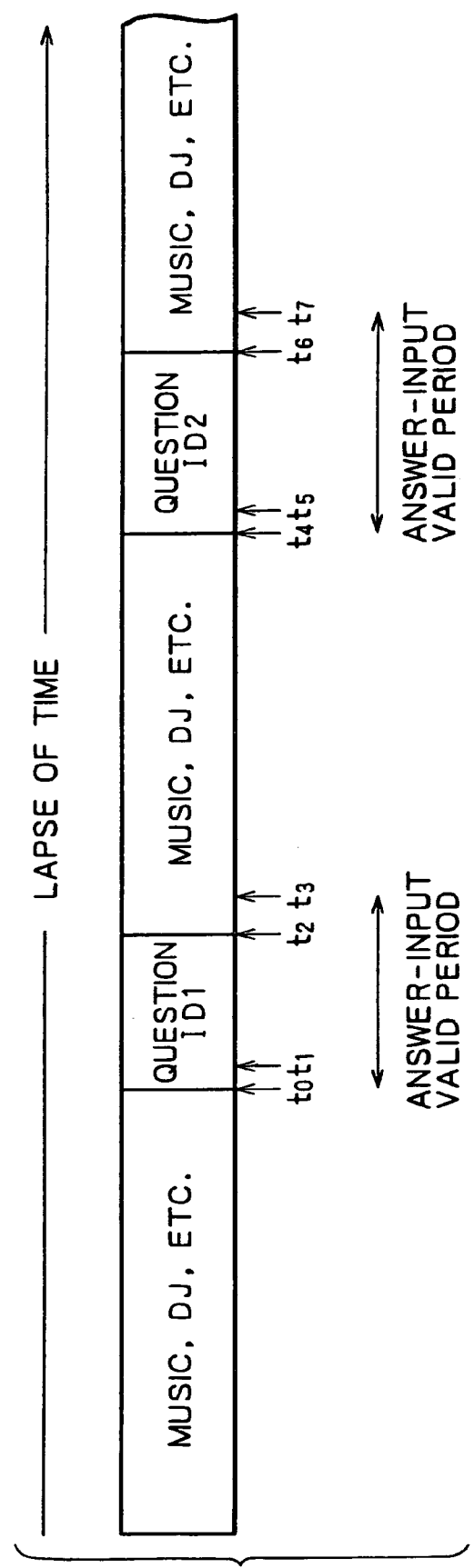
FIG. 25 is an explanatory diagram showing timings of questions included in a program broadcasted by a broadcasting apparatus employed in the information processing system shown in FIG. 1.

As shown in FIG. 25, the broadcasting apparatus 5 outputs an audio signal of question 1 or question 2 in a quiz or a questionnaire to respectively a period between times t0 and t2 or a period between times t4 and t6 during a program such as a disk jockey and music. At that time, a question ID1 or a question ID2 for identifying question 1 and question 2 respectively are embedded in the broadcasted signal along with the network address of the customer-number-assigning server 7 for collecting answers to the question. In addition, an activate signal is embedded into a period between times t1 and t3 slightly lagging behind the period between the times t0 and t2 or a period between times t5 and t7 slightly lagging behind the period between the times t4 and t6 in the broadcasted signal. A deactivate signal is embedded into other periods of the broadcasted signal.

Thus, in the example shown in FIG. 25, the receiver 10 is allowed to accept an answer to question 1 identified by the question ID1 from the user only during the period between the times t1 and t3 and to accept an answer to question 2 identified by the question ID2 only during the period between the times t5 and t7.

Figure 26:
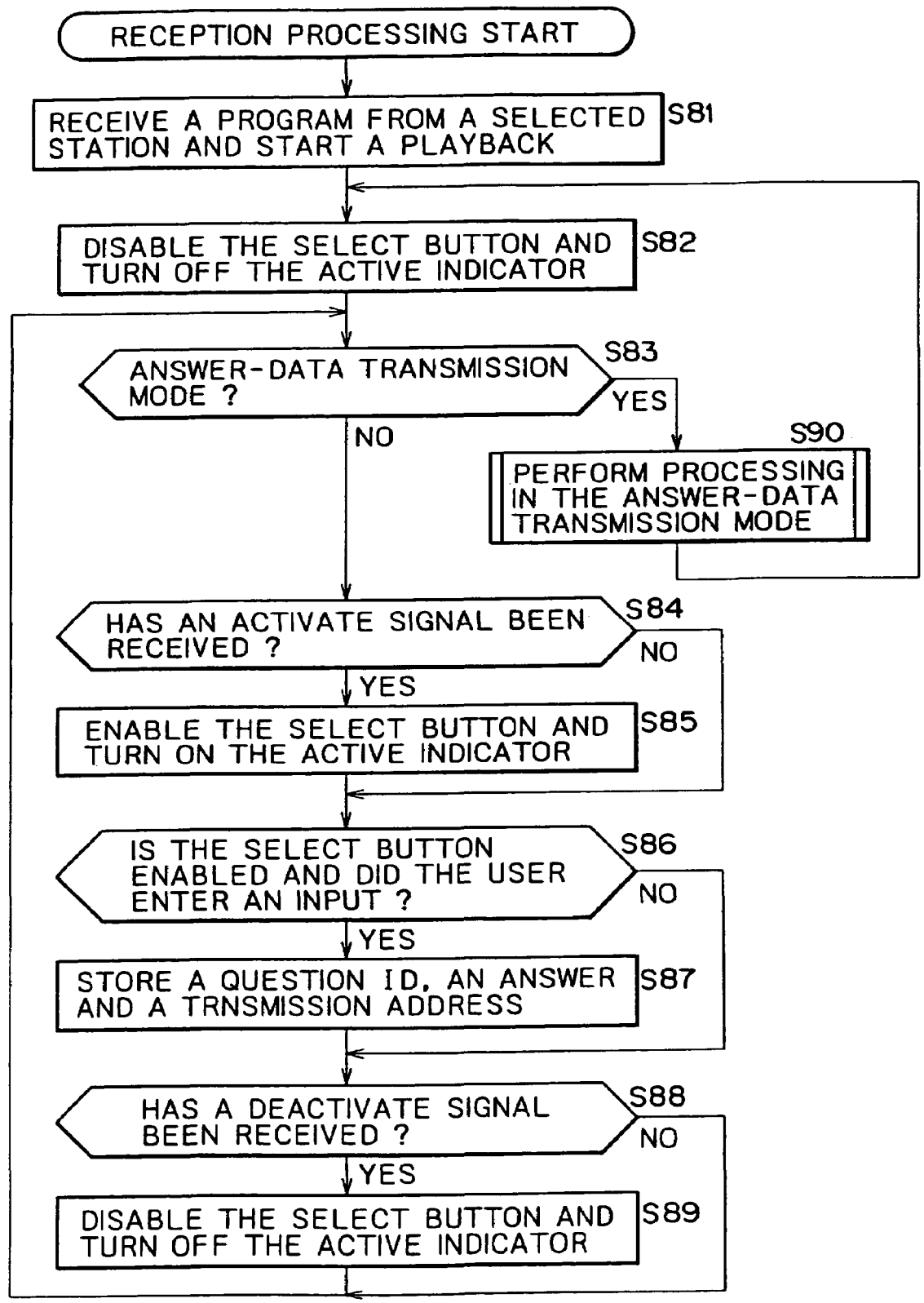
FIG. 26 is a flowchart used for explaining reception processing carried out by the receiver shown in FIG. 24.

Next, reception processing carried out by the receiver 10 is explained by referring to a flowchart shown in FIG. 26. The reception processing is started when the power supply of the receiver 10 is turned on.

The flowchart shown in FIG. 26 begins with a step S81 at which the station-selecting-unit 250 employed in the receiver 10 receives a broadcasted signal from a radio broadcasting station selected by operating the tuning slide 235 and outputs the signal to a component at the following stage. As a result, voices and sounds of the selected radio broadcasting station are output from the speaker 237.

At the next step S82, the control unit 241 controls the operation input unit 247 so as to ignore operations carried out by the user on the select button 232 and the cancel button 233. The control unit 241 also controls the display control unit 248 to turn off the active indicator 231. As a result, the select button 232 and the cancel button 233 are each put effectively in a state of being disabled to generate input signals and the active indicator 231 is turned off. The active indicator 231 is normally put in an off state. So, in this case, the off state is sustained.

At the next step S83, the control unit 241 forms a judgment as to whether or not the transmit button 236 has been pressed to set the response data transmission-mode. If the outcome of the judgment indicates that the response data transmission-mode has not been set, the flow of the reception processing goes on to a step S84.

At the next step S84, the control unit 241 forms a judgment as to whether or not an activate signal has been received. If the outcome of the judgment indicates that an activate signal has been received, the flow of the reception processing goes on to a step S85. At the step S85, the control unit 241 controls the operation input unit 247 so as to detect operations carried out by the user on the select button 232 and the cancel button 233 and also controls the display control unit 248 to turn on the active indicator 231. As a result, the select button 232 and the cancel button 233 are each put effectively in a state of being enabled to generate input signals and the active indicator 231 is turned on.

It should be noted that, if the outcome of the judgment formed at the step S84 indicates that an activate signal has not been received, on the other hand, the processing of the step S85 is skipped.

At the next step S86, the control unit 241 forms a judgment as to whether or not the select button 232 and the cancel button 233 are each put effectively in a state of being enabled to generate input signals and an answer to a question has been entered by operating the select button 232 and the cancel button 233. If the outcome of the judgment indicates that the select button 232 and the cancel button 233 are each put effectively in a state of being enabled to generate input signals and an answer to a question has been entered by operating the select button 232 and the cancel button 233, the flow of the reception processing goes on to a step S87.

At the next step S87, the control unit 241 stores an answer entered by operating the select button 232 and the cancel button 233 in response to a question, a question ID and the network address of a destination to which the answer is to be transmitted in the storage unit 249. The destination is the customer-number-assigning server 7. In the following description, the answer, the question ID and the network address of the destination are collectively referred to as answer-data.

It should be noted that, if the outcome of the judgment formed at the step S86 indicates that the select button 232 and the cancel button 233 have not each been put effectively in a state of being enabled to generate input signals or an answer to a question has not been entered by the user by operating the select button 232 and the cancel button 233, on the other hand, the processing of the step S87 is skipped.

At the next step S88, the control unit 241 forms a judgment as to whether or not a deactivate signal has been received. If the outcome of the judgment indicates that a deactivate signal has been received, the flow of the reception processing goes on to a step S89. At the step S89, the control unit 241 controls the operation input unit 247 so as to ignore operations carried out by the user on the select button 232 and the cancel button 233. The control unit 241 also controls the display control unit 248 to turn off the active indicator 231. As a result, the select button 232 and the cancel button 233 are each put effectively in a state of being disabled to generate input signals and the active indicator 231 is turned off.

Then, the flow of the reception processing goes back to the step S83 to carry out the processing repeatedly till the power supply of the receiver 10 is turned off.

It should be noted that, if the outcome of the judgment formed at the step S88 indicates that a deactivate signal has not been received, on the other hand, the flow of the reception processing goes back directly to the step S83, skipping the processing of the step S89. Then, the processing is carried out repeatedly till the power supply of the receiver 10 is turned off.

By the way, if the outcome of the judgment formed at the step S83 indicates that the answer-data transmission-mode has been set, on the other hand, the flow of the reception processing goes on to a step S90.

At the step S90, the control unit 241 carries out processing in the answer-data transmission-mode. The processing in the answer-data transmission-mode is explained by referring to a flowchart shown in FIG. 27.

The flowchart shown in FIG. 27 begins with a step S101 at which the control unit 241 forms a judgment as to whether or not the answer-data to be transmitted to the customer-number-assigning server 7 is stored in the storage unit 249. If the outcome of the judgment indicates that the answer-data to be transmitted to the customer-number-assigning server 7 is stored in the storage unit 249, the flow of the processing in the answer-data transmission-mode goes on to a step S102.

At the step S102, the control unit 241 selects a piece of answer-data stored in the storage unit 249 and reads out the selected piece of answer-data. At the next step S103, the control unit 241 extracts the network address of the customer-number-assigning server 7 serving as a destination from the piece of answer-data read out from the storage unit 249. Controlled by the control unit 241, the communication unit 253 makes an access to the destination by dialing in order to establish a communication.

At the next step S104, controlled by the control unit 241, the communication unit 253 transmits an answer and an answer ID included in the answer-data to the customer-number-assigning server 7 accessed at the step S103.

At the next step S105, the control unit 241 forms a judgment as to whether or not a reception-apparatus ID is to be added to the answer and the answer ID, which were transmitted at the step S104, and to be transmitted too. If the outcome of the judgment indicates that a reception-apparatus ID is to be added and to be transmitted as well, the flow of the processing in the answer-data transmission-mode goes on to a step S106. It should be noted that, as a condition for determining that a reception-apparatus ID is to be added and to be transmitted in this judgment, the apparatus collecting answers desires such a reception-apparatus ID and the user of the receiver 10 consents to transmission of the reception-apparatus ID. The existence or non-existence of the answer collecting apparatus' desire for a reception-apparatus ID is indicated by information embedded in the broadcasted signal.

At the step S106, controlled by the control unit 241, the transmission unit 253 transmits the reception-apparatus ID to the customer-number-assigning server 7 accessed at the step S103. It should be noted that, if the outcome of the judgment formed at the step S105 indicates that a reception-apparatus ID is not to be added and to be transmitted, on the other hand, the processing of the step S106 is skipped.

At the next step S107, controlled by the control unit 241, the storage unit 249 deletes the piece of answer-data transmitted at the step S104. At the next step S108, the control unit 241 forms a judgment as to whether or not the storage unit 249 still includes another piece of answer-data to be transmitted to the destination accessed at the step S103 to establish a communication therewith. If the outcome of the judgment indicates that such a piece of answer-data remains in the storage unit 249 to be transmitted to the destination with an established communication, the flow of the processing in the answer-data transmission-mode goes back to the step S104 to repeat the processing starting with the step S104.

If the outcome of the judgment formed at the step S108 indicates that no more piece of answer-data remains in the storage unit 249 to be transmitted to the destination with an established communication, on the other hand, the communication established at the step S103 is terminated. Then, the flow of the processing in the answer-data transmission-mode goes back to the step S101 to repeat the processing starting with the step S101.

If the outcome of the judgment formed at the step S101 indicates that no answer-data to be transmitted is stored in the storage unit 249, on the other hand, the flow of the processing in the answer-data transmission-mode goes on to a step S109. At the step S109, the control unit 241 releases the receiver 10 from the answer-data transmission-mode. The flow of the processing then goes back to the step S82 of the flowchart shown in FIG. 26.

By virtue of the reception processing carried out by the receiver 10 as described above, the user is capable of transmitting an answer to the customer-number-assigning server 7 automatically by merely pressing the transmit button 236 without performing processing to write words or to make a phone call.

In the reception processing described above, in the answer-data transmission-mode set by pressing the transmit button 236, answer-data is transmitted. It should be noted, however, that answer-data can also be transmitted periodically such as every Monday or every weekend. As an alternative, a piece of answer-data is transmitted only when the number of pieces of answer-data stored in the storage unit 249 exceeds a predetermined number.

Figure 28:
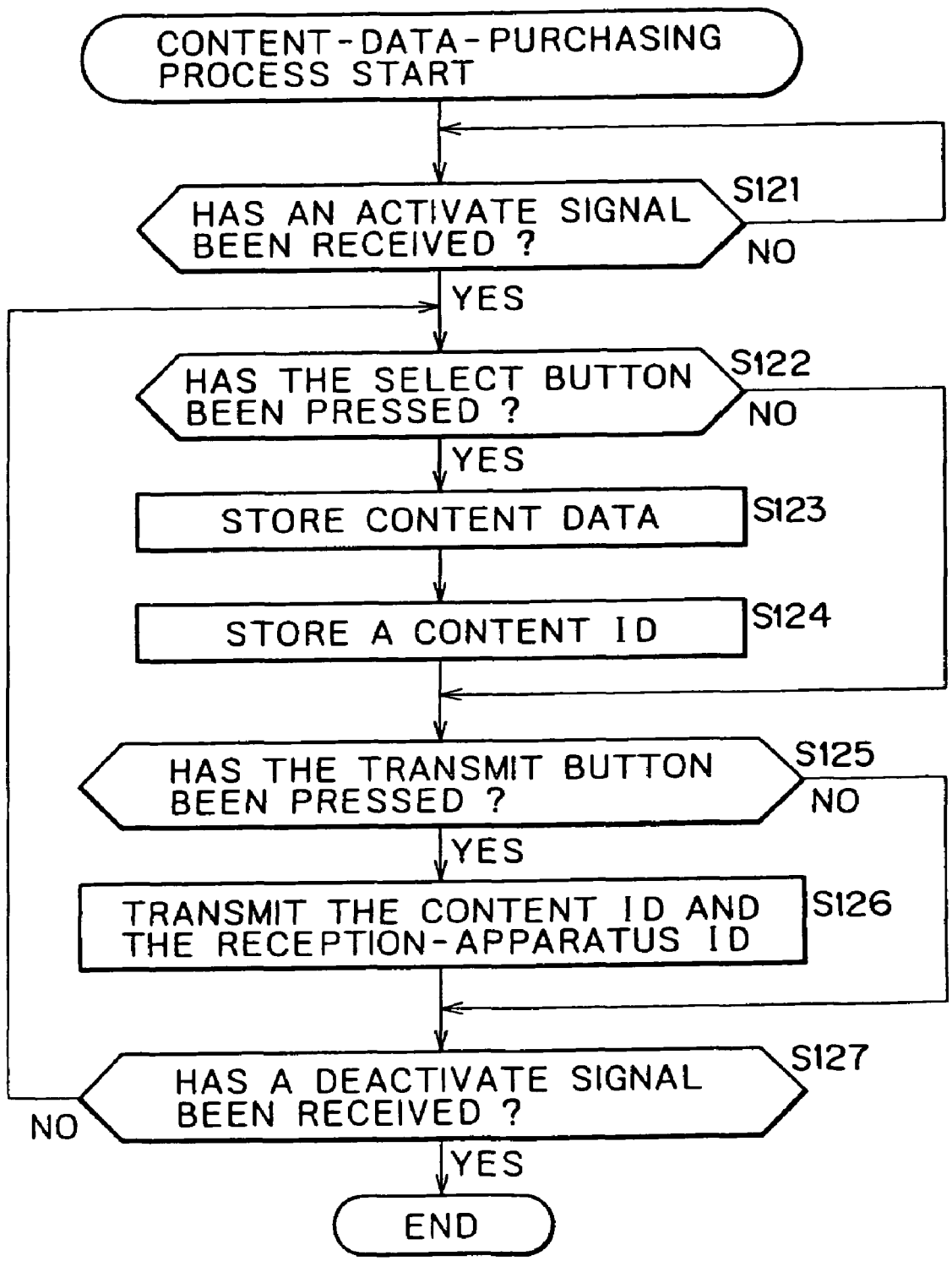
FIG. 28 is a flowchart used for explaining details of processing carried out by the receiver shown in FIG. 24 to purchase content data.

The following description explains processing carried out by the receiver 10 to purchase content data sold by multiplexing the data in a signal broadcasted by the broadcasting apparatus 5 by referring to a flowchart shown in FIG. 28. The processing to purchase content data is started when the control unit 241 detects content data multiplexed in a broadcasted signal in a radio broadcast received by the receiver 10.

The flowchart shown in FIG. 28 begins with a step S121 at which the control unit 241 forms a judgment as to whether or not an activate signal has been received. The control unit 241 is in a wait state, forming the judgment repeated till the outcome of the judgment indicates that an activate signal has been received. As the outcome of the judgment indicates that an activate signal has been received, the control unit 241 controls the operation input unit 247 so as to detect operations carried out by the user on the select button 232 and the cancel button 233 and also controls the display control unit 248 to turn on the active indicator 231. As a result, the select button 232 and the cancel button 233 are each put effectively in a state of being enabled to generate input signals and the active indicator 231 is turned on.

At the next step S122, the control unit 241 forms a judgment as to whether or not the select button 232 was pressed and the cancel button 233 was not. If the outcome of the judgment indicates that the select button 232 was pressed and the cancel button 233 was not, the flow of the purchase processing goes on to a step S123.

At the step S123, the storage unit 249 stores content data separated by the received-signal separation unit 251 in accordance with control executed by the control unit 241. At the next step S124, the storage unit 249 stores the campaign ID of the recorded content data in accordance with control executed by the control unit 241.

It should be noted that if the outcome of the judgment formed at the step S122 indicates that the select button 232 was not pressed or the cancel button 233 was pressed, on the other hand, the pieces of processing of the steps S123 and S124 are skipped.

At the next step S125, the control unit 241 forms a judgment as to whether or not the transmit button 236 was pressed. If the outcome of the judgment indicates that the transmit button 236 was pressed, the flow of the purchase processing goes on to a step S126. At the step S126, the transmission unit 253 transmits the campaign ID of a content data and the receiver-ID, which are stored in the storage unit 249, to the broadcasting apparatus 5 in accordance with control executed by the control unit 241.

At the next step S127, the control unit 241 forms a judgment as to whether or not a deactivate signal has been received. If the outcome of the judgment indicates that a deactivate signal has not been received, the flow of the purchase processing goes back to the step S122 to repeat the processing starting with the step S122. If the outcome of the judgment formed at the step S127 indicates that a deactivate signal has been received, on the other hand, the control unit 241 controls the operation input unit 247 so as to ignore operations carried out by the user on the select button 232 and the cancel button 233 and also controls the display control unit 248 to turn off the active indicator 231. As a result, the select button 232 and the cancel button 233 are each put effectively in a state of being disabled to generate input signals and the active indicator 231 is turned off.

As described above, if the outcome of the judgment formed at the step S122 indicates that the select button 232 was not pressed or the cancel button 233 was pressed, the pieces of processing of the steps S123 and S124 are skipped. If the outcome of the judgment formed at the step S125 indicates that the transmit button 236 was not pressed, on the other hand, the processing of the step S126 is skipped.

In the processing to purchase content data as described above, encrypted content data is stored in the storage unit 249. In order to make a request for a decryption key for decrypting the encrypted content data, it is necessary to transmit the campaign ID and the receiver-ID to the broadcasting apparatus 5.

The broadcasting apparatus 5 transmits a decryption key indicated by the campaign ID received from the receiver 10 to the receiver 10 indicated by the receiver-ID also received from the receiver 10.

In accordance with the above description, an additional-information-inputting prompt is transmitted by multiplexing the prompt with program data as encoded data. As an alternative, the additional-information-inputting prompt can also be stored in the database 43 of the ID-assigning functional unit 42. Then, in authentication processing with the customer-number-assigning functional unit 46, the additional-information-inputting prompt stored in the database 43 is detected and used for prompting the user to enter additional information.

In addition, while the customer-number-assigning functional unit 46 is provided in the customer-number-assigning server 7 in the embodiment described above, the customer-number-assigning functional unit 46 can also be provided in the receiver 10.

As an alternative, any 2 or more of the customer-number-assigning server 7, the anonymous-customer management server 8, the ID-assigning server 3 and the encoding server 4 can be combined into a single server configuration, or the encoding server 4 can also be integrated with the broadcasting apparatus 5 into a single unit.

Additional information can be entered in a variety of formats such as numbers of the ten keys, a text generated by the keyboard or a handwritten letter recognizing device, graphics generated by a pen or a mouse, a sound or a picture.

Profile-information of a user may include the age, content restrictions, a payment method, an occupation, a postal address, a name, an income, a gender, information on airline mileage, customer numbers for a variety of stores, favorite hotel rooms, information on smoking or non-smoking and other data, which are pertinent to the user.

In the processing described above, as settlement of an account, a payment can be made by using a credit card. However, the account-settlement method can also be determined from a gender and an occupation included in the profile-information. Assume for example that a service is rendered to transmit data representing a digital picture of commodity A through a network in return for information on the age, the gender and the hobbies of a person interested in commodity A. In this case, the fee of the service is determined by the age, the gender and the hobbies. The determination of the fee may also be regarded to fall within a broad definition of the meaning of an account-settlement method. In such a case, on the account-settlement method column of the database 51 shown in FIG. 22, in place of a credit card number of VISA 123 45678 XXXX, it is possible to prescribe a phrase stating: "The gender, the occupation and other data included in the profile-information."

The restriction described as the time and date information of a response condition is not limited to an end time and date but can also be a start time and date. While a time and date in a response condition according to the embodiment is acquired from the calendar timer 134 employed in the receiver 10, the time and date can also be acquired from a calendar timer provided in the customer-number-assigning functional unit 46. In this case, a time and date obtained from the calendar timer provided in the customer-number-assigning functional unit 46 is corrected and set as a time and date in the response condition. In this way, a correct time and date can be obtained from information generated by the calendar timer provided in the customer-number-assigning functional unit 46 even if the calendar timer 134 provided in the receiver 10 is out of order. By providing a calendar timer in the receiver 10, however, it is possible to set a deadline taking a time zone having a difference in time into consideration.

The restriction described as the time and date information of a response condition is used typically as a use restriction related to the validity term of a copyright of the content.

In a process of evaluation wherein a privacy-guarding item of a set is compared with a privacy-guarding item of another set, character-to-character comparison can be implemented. As an alternative, a distance between regions specified in an area-specifying process is treated as a variable of a function and evaluation can be carried out by comparing the value of a function with the value of another function.

In addition, the evaluation and the comparison of privacy-guarding items can be carried out by functions in a broadcasted manner.

Disclosures of all pieces of profile-information, all response conditions and all pieces of additional information to the member store every time do not contribute to protection of privacy. In addition, the member store does not always need all pieces of profile-information, all response conditions and all pieces of additional information. By storing all pieces of profile-information, all response conditions and all pieces of additional information in a memory, a memory with a large size is required inevitably. Furthermore, it is against the member store's will to hold the member store responsible for protection management only because the member store receives a more amount of information than necessary. Thus, prescription of privacy-guarding items is also meaningful to the member store since such prescription allows the member store to take in only necessary information. As for the user, it is possible to present itself as an anonymous participant.

Encoded data, a member-store ID, a campaign ID, a broadcasting reference ID, a response condition, profile-information, additional information and other data, which are held by the receiver 10, are stored in a memory that can be removed from the receiver 10 when necessary. Examples of such a memory are an IC card, a memory card, a memory stick (trademark), a CD, an MD, a hard disk, another kind of magnetic recording media and an optical recording medium. In this way, by connecting the main unit of the receiver 10 to the customer-number-assigning functional unit 46 or by connecting only such a memory to the customer-number-assigning functional unit 46, it is possible to carry out verification.

The above description explains an example in which the present invention is applied to satellite digital radio communication. As explained as the specifications shown in FIG. 14, however, encoded data can be broadcasted by adoption of the multi-cast technique using the hand phone or the Internet or by adopting another communication technique such as satellite television, ground-wave television, ground-wave radio, CATV or satellite-data communication.

The series of pieces of processing described above can be carried out by hardware or through execution of software. When execution of software is selected for carrying out the series of pieces of processing, a variety of programs composing the software are executed by a computer incorporated in special hardware. As an alternative, the programs are installed in a recording memory employed in typically a general purpose personal computer capable of executing the programs to carry out the pieces of processing.

As shown in FIG. 3, a recording medium for presenting a program to the user is broadcasted separately from the main unit of the apparatus. In order to present a program to the user, however, the use of package media is not mandatory. As mentioned before, examples of the package media are the magnetic disk 71 including a floppy disk, the optical disk 72 including a CD-ROM (Compact Disk Read Only Memory) and a DVD (Digital Versatile Disk), the magnetic optical disk 73 including an MD (Mini Disk) and the semiconductor memory 74. As an alternative, a program can also be presented to the user by incorporating the program in the main unit of the apparatus in advance. That is to say, the program is stored in a ROM 62 or a hard disk included in the storage unit 68.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or independently.

In addition, the technical term 'system' used in this specification means the whole equipment comprising a plurality of apparatuses.

In accordance with the system described above, the following effects are exhibited.

1: The ID assignment function and the verification function are separated from member stores and shared by the member stores as functions independent of the member stores. Thus, the functions can be provided for a plurality of member stores.

2: By carrying out a tagging process and enclosing a portion relying on media in a tag, the portion can be made independent of the ID assignment function and the verification function and, therefore, the functions can be provided for a plurality of media.

3: By allowing the ID assignment function on the content sender side and the verification function on the content recipient side to share information, responses from recipients can be collated with offerings broadcasted by broadcasting by using a mechanized means with a higher degree of efficiency.

4: By leaving a validity-condition set by a member store with the ID assignment function, the validity-condition can be collated with a receiver's response condition, profile-information and additional information by using a mechanized means with a higher degree of efficiency.

5: A mechanically collectable environment of a receiver which is dependent on a response condition can be collated with a validity-condition.

6: A receiver's environment cataloged in advance from profile-information can be collated with a validity-condition.

7: Information input from a receiver on the spot as additional information can be collated with a validity-condition.

8: Since privacy-guarding items can be left with a privacy-guarding functional unit, privacy-guarding items declared by the presentation functional unit, an ID assignment functional unit, a verification functional unit and the reception functional unit can be collated with each other by using a mechanized means. As a result, an anonymous person is capable of obtaining a content.

9: Since a function to order and deliver an actual commodity, that is, a content, and a function to determine a price for the commodity are separated from and made independent of a presentation functional unit and a reception functional unit, it is possible to implement a system adaptable to a variety of digital content secured deliveries and various kinds of commodity and financial circulation.

While a preferred embodiment of the present invention has been described using specific terms, such description is for illustrative purposes only, and it is to be understood that changes and variations may be made without departing from the spirit or scope of the following claims.

What is claimed is:

1. A broadcast signal receiver, comprising:
   a station-selecting-unit configured to receive a signal broadcasted by a radio broadcasting station;
   a received-signal separation unit configured to separate an audio signal from the broadcasted signal and separate other signals from the broadcasted signal, said other signals including a question ID with a question and a network address of a customer-number-assigning server;
   a content and question-playback unit configured to playback the audio signal received from the received-signal separation unit and output a signal obtained as a result of the playback operation to a speaker;
   a select button configured to receive a user entry to a response to a broadcasted question associated with the question ID;
   a storage unit configured to store a unique receiver-ID assigned to the receiver, downloaded content data, and a response to the question ID with the question; and
   an antenna configured to transmit a radio signal conveying the question ID and the response associated with the question stored in the storage unit.

2. A method of receiving a broadcast signal, comprising the steps of:
   receiving a signal broadcasted by a radio broadcasting station;
   separating an audio signal from the broadcasted signal;
   separating other signals from the broadcasted signal, said other signals including a question ID with a question and a network address of a customer-number-assigning server;
   playing back the received audio signal;
   outputting a signal obtained as a result of the playback step to a speaker;
   receiving a user-entered response to a broadcasted question associated with the question ID;
   storing a unique receiver-ID assigned to the receiver, downloaded content data, and a response to the question ID with the question; and
   transmitting a radio signal conveying the question ID and the response associated with the question.

3. A broadcast signal receiver, comprising:
   means for receiving a signal broadcasted by a radio broadcasting station;
   means for separating an audio signal from the broadcasted signal;
   means for separating other signals from the broadcasted signal, said other signals including a question ID with a question and a network address of a customer-number-assigning server;
   means for playing back the received audio signal;
   means for outputting a signal obtained as a result of the playback step to a speaker;
   means for receiving a user-entered response to a broadcasted question associated with the question ID;
   means for storing a unique receiver-ID assigned to the receiver, downloaded content data, and a response to the question ID with the question; and
   means for transmitting a radio signal conveying the question ID and the response associated with the question.

* * * * *